(12) United States Patent
Komatsu et al.

(10) Patent No.: US 9,436,010 B2
(45) Date of Patent: Sep. 6, 2016

(54) VIRTUAL IMAGE DISPLAY APPARATUS HAVING PRISM WITH SPECIFIC POLYNOMIAL RELATIONSHIP BETWEEN PRISM SURFACE SHAPES

(71) Applicant: SEIKO EPSON CORPORATION, Tokyo (JP)

(72) Inventors: Akira Komatsu, Kamiina-gun (JP); Takahiro Totani, Suwa (JP); Takashi Takeda, Suwa (JP); Toshiaki Miyao, Matsumoto (JP); Masayuki Takagi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 355 days.

(21) Appl. No.: 13/773,058

(22) Filed: Feb. 21, 2013

(65) Prior Publication Data

US 2013/0222896 A1    Aug. 29, 2013

(30) Foreign Application Priority Data

Feb. 24, 2012 (JP) ................................. 2012-038382
Dec. 11, 2012 (JP) ................................. 2012-270071

(51) Int. Cl.
    *G02B 27/01* (2006.01)
    *G02B 17/08* (2006.01)

(52) U.S. Cl.
    CPC ......... *G02B 27/0172* (2013.01); *G02B 17/086* (2013.01); *G02B 17/0848* (2013.01); *G02B 27/0101* (2013.01); *G02B 27/017* (2013.01); *G02B 2027/0123* (2013.01)

(58) Field of Classification Search
    CPC .................. G02B 2027/0123; G02B 17/0848; G02B 27/0172; G02B 27/017; G02B 27/0101; G02B 17/086

USPC ................ 359/362, 364–366, 480–482, 618, 359/629–633, 637, 639–640, 831, 833–834, 359/837, 838–839, 879–880
See application file for complete search history.

(56) References Cited

U.S. PATENT DOCUMENTS

| 4,592,636 A | 6/1986 | Kato et al. |
| 5,453,877 A | 9/1995 | Gerbe et al. |

(Continued)

FOREIGN PATENT DOCUMENTS

| EP | 0 790 513 A2 | 8/1997 |
| JP | B2-2746697 | 5/1998 |

(Continued)

OTHER PUBLICATIONS

May 27, 2013 European Search Report issued in European Patent Application No. EP 13156632.5.

(Continued)

*Primary Examiner* — Stephone B Allen
*Assistant Examiner* — Ryan S Dunning
(74) *Attorney, Agent, or Firm* — Oliff PLC

(57) ABSTRACT

An intermediate image is formed inside a prism by a projection lens and the like. Image light, totally reflected, in the order of a third surface, a first surface and a second surface, on two or more surfaces thereof, reaches an eye of an observer after passing through the first surface. Thus, it is possible to decrease the thickness of the prism and to reduce the size and weight of the entire optical system. Further, it is possible to realize a bright high-performance display with a wide viewing angle. With respect to external light, it is possible to pass the external light through the first surface and the third surface, for example, for observation. Further, by setting diopter at this time to about 0, it is possible to reduce defocusing or warp of the external light when the external light is observed in a see-through manner.

13 Claims, 24 Drawing Sheets

(56) References Cited

U.S. PATENT DOCUMENTS

| | | | |
|---|---|---|---|
| 5,546,227 A * | 8/1996 | Yasugaki et al. | 359/630 |
| 6,201,646 B1 | 3/2001 | Togino et al. | |
| 6,310,736 B1 | 10/2001 | Togino | |
| 7,483,225 B2 | 1/2009 | Shimo | |
| 7,522,342 B2 | 4/2009 | Inoguchi et al. | |
| 7,699,473 B2 | 4/2010 | Mukawa et al. | |
| 8,116,006 B2 | 2/2012 | Shimizu et al. | |
| 2002/0034016 A1 | 3/2002 | Inoguchi et al. | |
| 2004/0233555 A1 | 11/2004 | Matsunaga | |
| 2005/0078378 A1 * | 4/2005 | Geist | 359/630 |
| 2005/0254107 A1 | 11/2005 | Amanai | |
| 2008/0055193 A1 | 3/2008 | Tsuyuki et al. | |
| 2013/0222896 A1 | 8/2013 | Komatsu et al. | |
| 2013/0222919 A1 * | 8/2013 | Komatsu et al. | 359/630 |

FOREIGN PATENT DOCUMENTS

| | | |
|---|---|---|
| JP | 2000066106 A | 3/2000 |
| JP | A-2000-105338 | 4/2000 |
| JP | 2000131614 A | 5/2000 |
| JP | 2000199853 A | 7/2000 |
| JP | 2004341411 A | 12/2004 |
| JP | B2-3787399 | 6/2006 |
| JP | 2008158203 A | 7/2008 |
| JP | B2-4218553 | 2/2009 |
| JP | 2010-048841 A | 3/2010 |
| JP | 2011-002514 A | 1/2011 |
| JP | B2-4819532 | 11/2011 |
| JP | 2013-200553 A | 10/2013 |
| WO | WO 2012/088478 A1 | 6/2012 |

OTHER PUBLICATIONS

U.S. Appl. No. 13/772,838, filed Feb. 21, 2013.
Oct. 7, 2014 Office Action issued in U.S. Appl. No. 13/772,838.
Feb. 10, 2015 Office Action issued in U.S. Appl. No. 13/772,838.
Dec. 23, 2015 Examiner's Answer to Appeal Brief issued in U.S. Appl. No. 13/772,838.

* cited by examiner

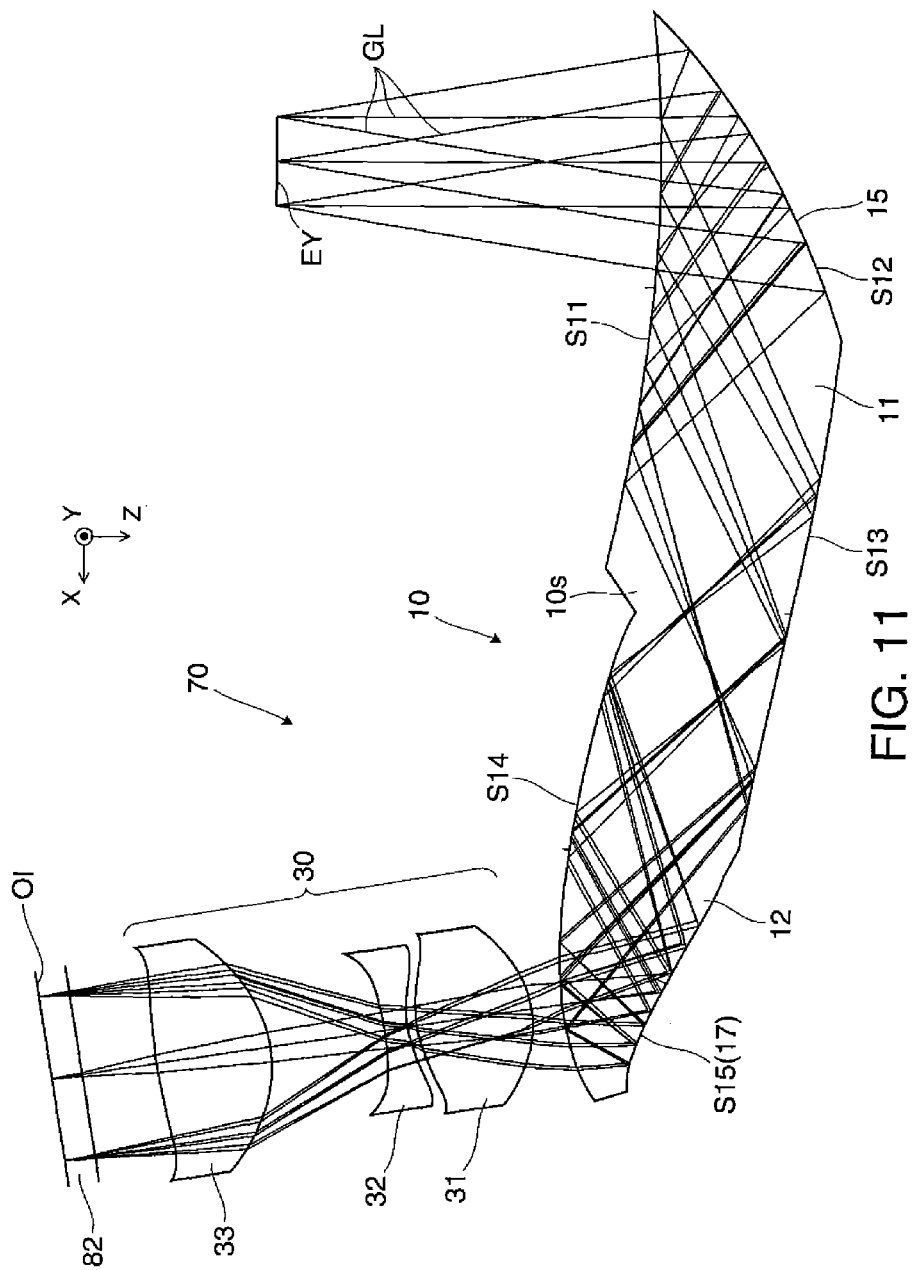

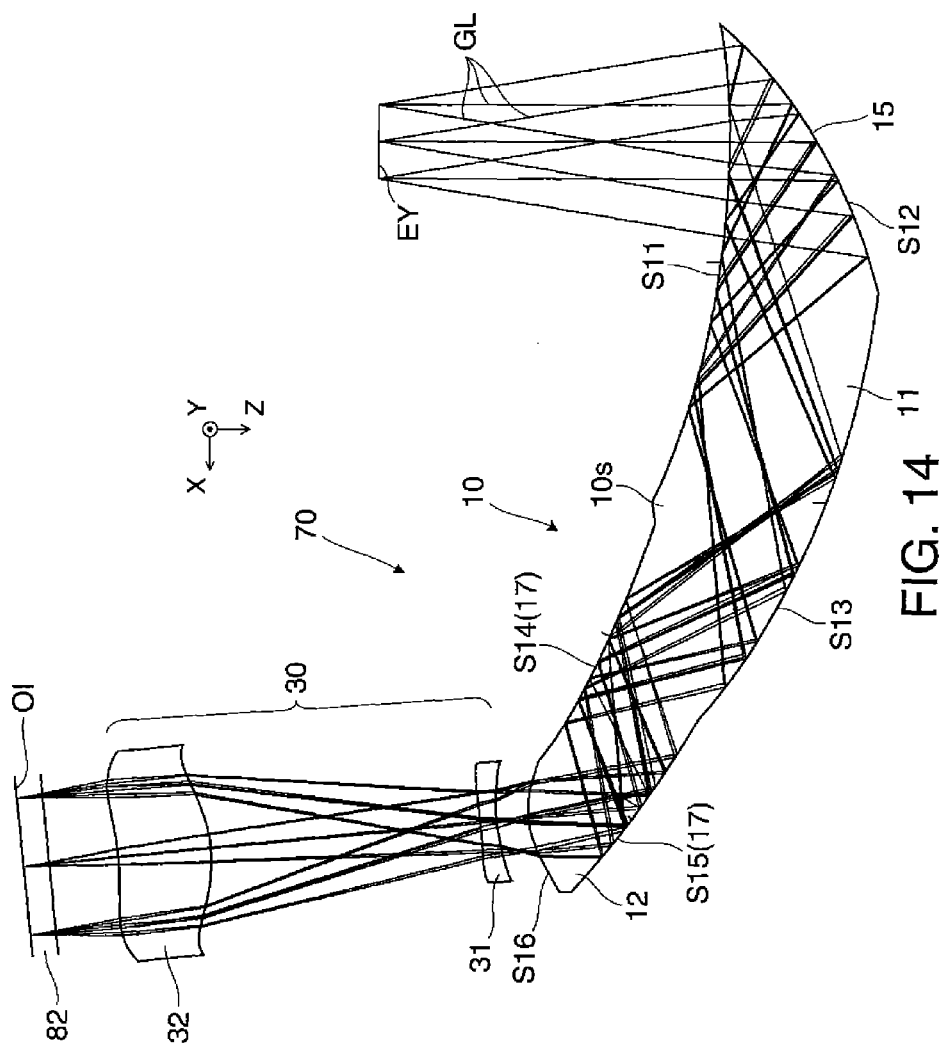

VIRTUAL IMAGE DISPLAY APPARATUS HAVING PRISM WITH SPECIFIC POLYNOMIAL RELATIONSHIP BETWEEN PRISM SURFACE SHAPES

BACKGROUND

1. Technical Field

The present invention relates to a virtual image display apparatus that provides an image formed by an image display element or the like to an observer, and more particularly, to a virtual image display apparatus that is suitable for a head-mounted display mounted to the head of the observer.

2. Related Art

A variety of optical systems have been proposed as an optical system that is assembled in a virtual image display apparatus such as a head-mounted display (hereinafter, referred to as an HMD) mounted to the head of an observer (refer to Japanese Patent Nos. 2746697, 3787399, 4218553 and 4819532).

With respect to the virtual image display apparatus such as an HMD, it is desirable to enlarge a viewing angle of image light and to reduce the weight of the apparatus. In particular, in order to improve the fit, it is important to decrease the thickness in a visual axis direction of an observer and to make the center of gravity close to the observer.

Further, if the field of view of the observer is entirely covered and thus only image light is viewed, an external scene is not viewed by the observer, which may cause uneasiness for the observer. Further, as the external scene and the image to be viewed are overlapped, a variety of new usages of virtual reality is created. Thus, it is desirable to use a display that displays image light in an overlapping manner without obstructing the field of view of the external scene.

Further, in order to improve the fit for the observer and to make the appearance of the form neat, it is generally preferable that the form of the HMD be close to the form of glasses, and it is preferable that the image display device be disposed across the face particularly across the eyes, instead of being disposed above the eyes.

In order to decrease the size of the optical system and to position the image display device according to the position of the eyes of the observer, so as not to obstruct the field of view, it is preferable to first form the display image light in the optical system to form an intermediate image and to use a relay optical system that enlarges the intermediate image to be viewed.

For example, Japanese Patent No. 2746697 discloses a relay optical system that uses a light guiding plate of a parallel plane shape in which a parabolic mirror is provided at an end surface thereof and a projection lens, and forms an intermediate image inside the light guiding plate. However, in the case of the optical system disclosed in Japanese Patent No. 2746697, the projection lens is large in size, which prevents a reduction in size and weight.

Japanese Patent No. 3787399 discloses a relay optical system that uses a light guiding prism having a curved exiting reflective surface and a projection lens. However, the optical system disclosed in Japanese Patent No. 3787399 has no consideration of allowing the observer to view an external scene. In order to view the external scene by applying this optical system, it is necessary to attach a compensation prism onto the reflective surface enlarged over the entire prism and to provide a half mirror on the bonding surface. However, since image light is reflected on the half mirror surface twice, an image becomes very dark.

Japanese Patent No. 4218553 discloses a relay optical system that includes a projection lens, a concave mirror and a light guiding plate. In this optical system, a wavelength plate and a polarization half mirror are combined to enhance the reflection efficiency. However, in order to view an external scene by applying the optical system disclosed in Japanese Patent No. 4218553, it is necessary to attach a compensation lens onto the concave mirror, which generally increases the thickness.

Japanese Patent No. 4819532 discloses a relay optical system that has a short overall length and a compact arrangement due to a bent optical path. However, in the case of the optical system disclosed in Japanese Patent No. 4819532, a convex portion at the center of a prism or a projection lens obstructs the field of view. Further, since image light passing through a half mirror, is returned, and reflected on the half mirror, and is then incident on the eyes, an observed image becomes dark.

SUMMARY

An advantage of some aspects of the invention is to provide a virtual image display apparatus that has a see-through function of displaying external light and image light in an overlapping manner, having a wide viewing angle, high performance, a small size and a lightweight.

An aspect of the invention is directed to a virtual image display apparatus that causes an observer to visually recognize image light and external light at the same time, including: an image element that generates image light; and a single prism that has three or more non-axisymmetric curved surfaces and forms a part of an optical system, in which an intermediate image is formed therein, wherein when the observer visually recognizes an external scene through a first surface and a third surface among the plurality of surfaces that form the prism, diopter is about 0, wherein the first surface and the third surface form concave surfaces with respect to the observer, and wherein the image light from the image element is totally reflected on the third surface, is totally reflected on the first surface, and is reflected on a second surface and then passes through the first surface to reach the observer. Here, the image light refers to light that is formed by the image element or the like and is recognizable as a virtual image by the eyes, in which the intermediate image is formed inside the prism as describe above.

In the above-described virtual image display apparatus, since the intermediate image is formed inside the prism by the optical system or the like and the image light reflected in the order of the third surface, the first surface and the second surface then passes through the first surface to reach the observer, it is possible to realize a bright high-performance display with a wide viewing angle while thinning the prism to reduce the size and weight of the entire optical system. Further, with respect to external light, since the external light may pass through the first surface and the third surface to be observed and diopter at this time is about 0, it is possible to reduce defocusing or warp of the external light when the external light is observed in a see-through manner. Further, the prism has a shape along the face of the observer, the center of gravity may be close to the face, and a superior design may be achieved.

In a specific aspect of the invention, in the virtual image display apparatus described above, when an expression of a planar shape is expanded as a polynomial, on the basis of the origin of each surface that forms the optical system, with respect to orthogonal coordinates x and y extending in a tangential direction from the origin, the following conditions (1) to (3) are satisfied where a coefficient of a term $x^m \cdot y^n$ of a polynomial indicating a k-th surface is $Ak_{m,n}$.

$$-5 \times 10^{-2} < A1_{2,0} + A1_{0,2} < -1 \times 10^{-3} \text{ and}$$

$$-5 \times 10^{-2} < A3_{2,0} + A3_{0,2} < -1 \times 10^{-3} \quad (1)$$

$$|A3_{2,0} - A3_{0,2}| < 1 \times 10^{-2} \quad (2)$$

$$|A1_{2,0} - A3_{2,0}| < 5 \times 10^{-3} \text{ and}$$

$$|A1_{0,2} - A3_{0,2}| < 5 \times 10^{-3} \quad (3)$$

Here, local coordinates (x, y, z) including the orthogonal coordinates x and y of each surface has a specific point on the curved surface as the origin, and has the z axis in a normal direction of the surface and the x and y axes in the tangential direction of the surface. The origin of the curved surface corresponds to a position where the center of light flux passes, for example.

In the aspect of the invention, as the first surface and the third surface associated with observation of the external light in addition to the image light have free-form surfaces and have concave shapes toward the observer, it is possible to effectively use the degrees of freedom of these curved surfaces, and to achieve an optical system of high image quality. Actions of the first surface and the third surface, that is, action of the curved surface is characterized by the curvature of the curved surface. Here, since the curvature around the origin is mainly determined by values of coefficients $Ak_{2,0}$ and $Ak_{0,2}$ (k=1, 3), it is important to appropriately set the values of coefficients $Ak_{2,0}$ and $Ak_{0,2}$.

The condition (1) defines the sizes of the curvature of the first surface and the curvature of the third surface around the origin. If the values of $A1_{2,0}$, $A1_{0,2}$, $A3_{2,0}$ and $A3_{0,2}$ are negative, this represents that the first surface or the third surface has a concave shape toward the observer. Beyond an upper limit of the condition (1), the shape is close to a plane. Thus, even though there is no problem in observation of the external light, it is difficult to effectively correct aberration of the image light. Further, below a lower limit of the condition (1), the curvature is excessively strong. Thus, it is difficult to perform aberration correction, and since the position of the prism is close to the face, the fit deteriorates.

The condition (2) defines the difference between the curvature of the third surface in the x axis direction and the curvature thereof in the y axis direction. Beyond an upper limit of the condition (2), astigmatism occurring on the third surface is excessively large, and thus, it is difficult to perform aberration correction.

The condition (3) defines the difference between the curvature of the first surface and the curvature of the third surface, relating to the x axis direction and the y axis direction, and influences diopter of the prism with respect to the external light. When the thickness of the prism is T and the refractive index thereof is N, diopter Dx on the optical axis of the prism in the x axis direction and diopter Dy in the y axis direction are obtained as follows.

$$Dx = 2000(N-1)(A1_{2,0} - A3_{2,0} + (2T(N-1)/N) \times A1_{2,0} \times A3_{2,0})$$

$$Dy = 2000(N-1)(A1_{0,2} - A3_{0,2} + (2T(N-1)/N) \times A1_{0,2} \times A3_{0,2})$$

In general, if an error of distant diopter exceeds ±1D, this causes discomfort. Thus, it is preferable to suppress diopter of the prism in ±1D. However, due to the balance with diopter or aberration of an outer peripheral portion, there is a case where diopter on the optical path is set in the range of ±2D in design. Diopter on the optical path is associated with the thickness or refractive index of the prism as in the above expressions and thus is not determined by only a value of an aspheric coefficient. However, if the coefficient is in a range satisfying the condition (3), it is possible to suppress diopter on the optical path in the range of ±2D.

As the first surface and the third surface have the shapes satisfying the conditions (1) to (3), it is possible to favorably perform aberration correction of both the external light and the image light, and to obtain superior image quality.

In another aspect of the invention, the prism includes the first surface, the second surface and the third surface and include a first prism portion on a light exiting side and a second prism portion on a light incident side, and the first prism portion and the second prism portion are integrally formed.

In still another aspect of the invention, a half mirror is formed on the second surface to provide the image light to the observer, and a light transmitting member is integrally disposed on an outer side of the second surface so that diopter to the external light is about 0 to provide the external light and the image light to the observer in an overlapping manner. In this case, it is possible to reduce defocusing or warp of the external light observed outside the second surface.

In yet another aspect of the invention, the light transmitting member includes a first transmitting surface and a second transmitting surface on the observer side and includes a third transmitting surface on the external side, the second surface of the prism and the second transmitting surface of the light transmitting member have approximately the same curved surface shape, and the second surface and the second transmitting surface are integrated. In this case, it is possible to bond and integrate the surfaces, and to respectively form continuous surfaces on the sides of the first surface and the third surface.

In still yet another aspect of the invention, the virtual image display apparatus further includes a projection lens that causes the image light from the image element to be incident onto the prism, and at least a part of the prism and the projection lens form a relay optical system that forms the intermediate image.

In further another aspect of the invention, the projection lens is configured by an axisymmetric lens, and includes at least one aspheric surface.

In still further another aspect of the invention, the second prism portion includes at least one optical surface, and the intermediate image is formed by the image element, the projection lens and the second prism portion. In this case, the optical surface of the second prism portion contributes to formation of the intermediate image as a part of the relay optical system.

In yet further another aspect of the invention, the image element is an image display element that emits the image light from a display position, and the projection lens and the second prism portion, as the relay optical system, form the image light emitted from the display position of the image display element inside the prism to form the intermediate image. In this case, since the projection lens and the like functions as the relay optical system, it is possible to re-combine the image light emitted from each point on the display position of the image display element inside the prism to form the intermediate image.

In still yet further another aspect of the invention, the second prism portion includes at least one optical surface commonly having functions of a refractive surface and a reflective surface.

In a further aspect of the invention, an interval between the first surface and the third surface is 5 mm or more and 15 mm or less. In this case, by setting the interval to be 5 mm or more, it is possible to sufficiently increase the size of the first prism that covers the front of the eyes, and by setting the interval to be 15 mm or less, it is possible to suppress increase in the weight.

In a still further aspect of the invention, an inclination angle of the second surface with respect to the first surface is 20° or more and 40° or less. In this case, by setting the inclination angle in this range, it is possible to easily cause the image light to enter the eyes with an appropriate number of reflections and an appropriate reflection angle.

In a yet further aspect of the invention, the optical system including the prism covers a part of the front of eyes of the observer in wearing, while remaining a different part of the front of the eyes that is not covered.

In a still yet further aspect of the invention, the image element includes a signal light forming unit that emits modulated signal light corresponding to an image and a scanning optical system that scans the signal light incident from the signal light forming unit and emits the scanned signal light as a scanning light.

BRIEF DESCRIPTION OF THE DRAWINGS

The invention will be described with reference to the accompanying drawings, wherein like numbers reference like elements.

FIG. 11 is a diagram illustrating an optical system according to Example 3.

FIG. 14 is a diagram illustrating an optical system according to Example 4.

DESCRIPTION OF EXEMPLARY EMBODIMENTS

Hereinafter, a virtual image display apparatus of an embodiment according to the invention will be described in detail with reference to the accompanying drawings.

A. External Appearance of Virtual Image Display Apparatus

Figure 1:
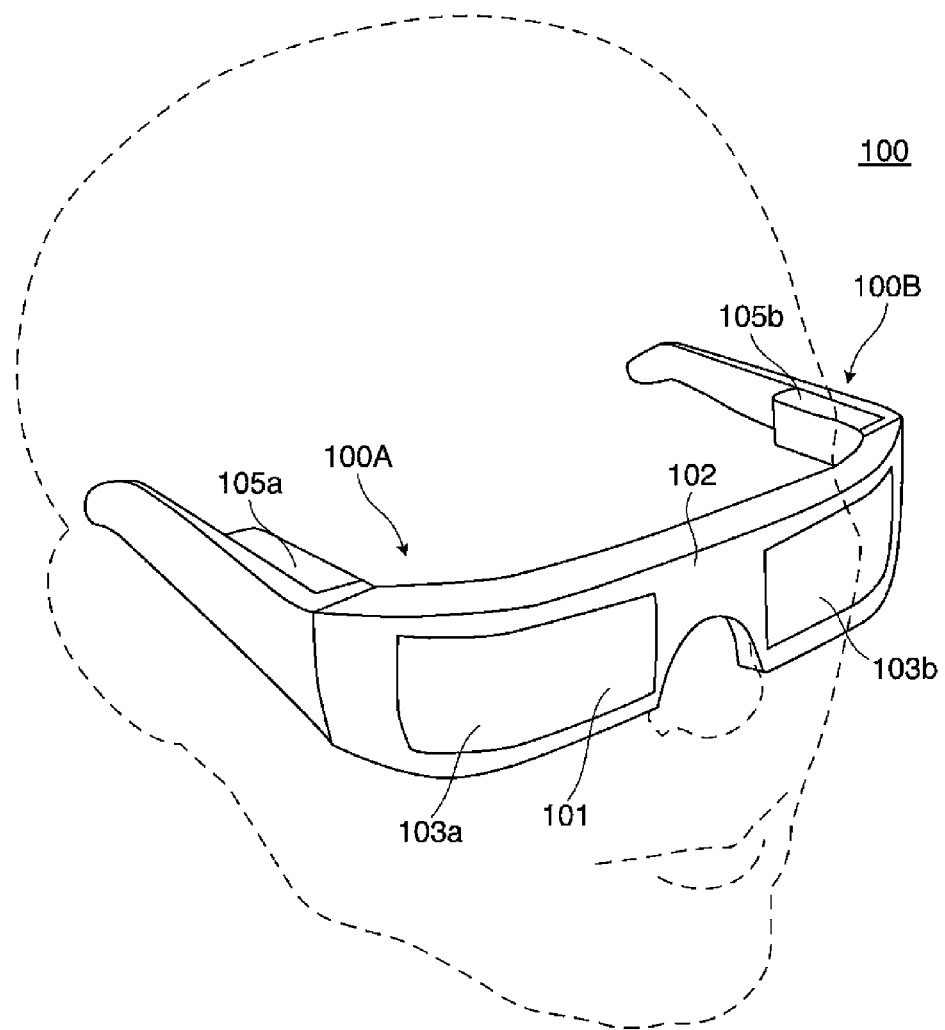
FIG. 1 is a perspective view illustrating an appearance of a virtual image display apparatus according to an embodiment.

A virtual image display apparatus 100 according to an embodiment shown in FIG. 1 is a head-mounted display having the same external appearance as that of glasses, and enables an observer wearing the virtual image display apparatus 100 to visually recognize image light corresponding to a virtual image and enables the observer to visually recognize or observe an external image in a see-through manner. The virtual image display apparatus 100 includes a see-through member 101 that covers the front of the observer's eyes, a frame 102 that supports the see-through member 101, and first and second built-in device portions 105*a* and 105*b* that are provided at portions ranging from cover portions at right and left ends of the frame 102 to rear temples of the frame 102. Here, the see-through member 101 is an optical member (see-through eye cover) that is bent with a thickness for covering the front of the observer's eyes, and includes a first optical portion 103*a* and a second optical portion 103*b*. A first display apparatus 100A including the first optical portion 103*a* and the first built-in device portion 105*a* on the left side in the drawing is a portion that forms a right-eye virtual image, and independently functions as a virtual image display apparatus. Further, a second display apparatus 100B including the second optical portion 103*b* and the second built-in device portion 105*b* on the right side in the drawing is a portion that forms a left-eye virtual image, and independently functions as a virtual image display apparatus.

B. Structure of Display Apparatus

Figure 2:
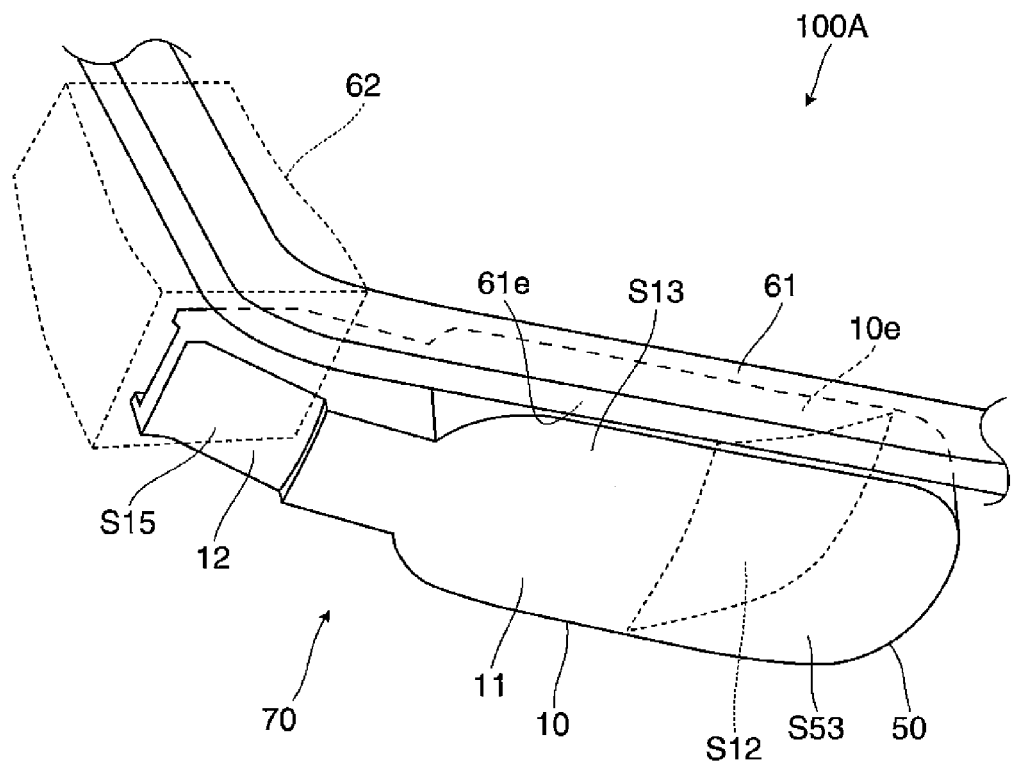
FIG. 2 is a perspective view illustrating a structure of a main body of a virtual image display apparatus.
Figure 3A:
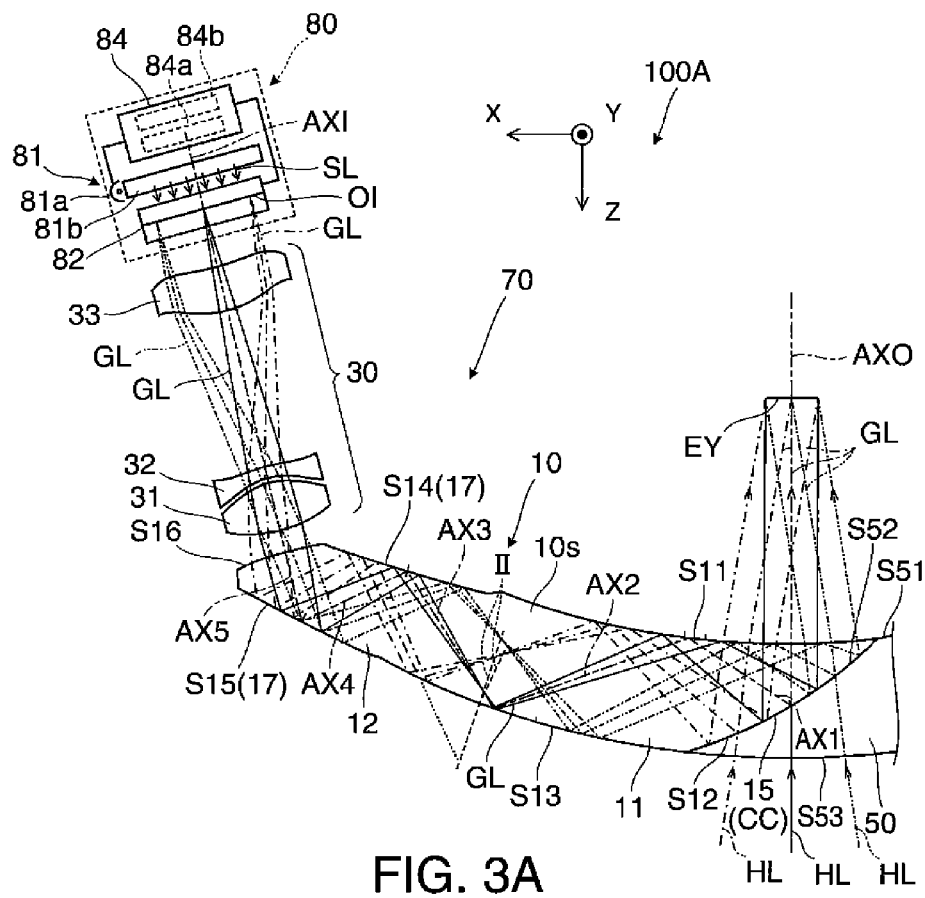
FIG. 3A is a cross-sectional view illustrating a main body portion of a first display apparatus that forms a virtual image display apparatus, when seen from a planar view.
Figure 3B:
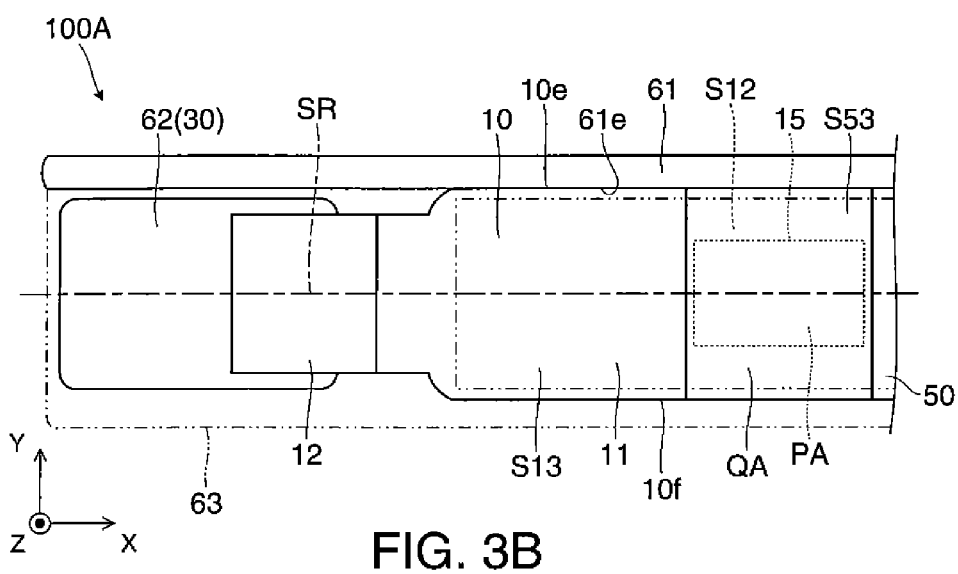
FIG. 3B is a front view of the main body portion.

As shown in FIG. 2, FIGS. 3A and 3B and the like, the first display apparatus 100A includes a projection see-through device 70 and an image display device 80. Here, the projection see-through device 70 includes a prism 10 that is a light guiding member, a light transmitting member 50, and an imaging projection lens 30. The prism 10 and the light transmitting member 50 are integrated by bonding, and are firmly fixed onto a lower side of a frame 61 so that an upper surface 10*e* of the prism 10 is in contact with a lower surface 61*e* of the frame 61, for example. The projection lens 30 is fixed to an end portion of the prism 10 through a lens tube 62 that accommodates the projection lens 30. The prism 10 and the light transmitting member 50 of the projection see-through device 70 correspond to the first optical portion 103a in FIG. 1, and the projection lens 30 of the projection see-through device 70 and the image display device 80 correspond to the first built-in device portion 105a in FIG. 1. Further, since the second display apparatus 100B shown in FIG. 1 has the same structure as that of the first display apparatus 100A, and the left and right are only reversed, detailed description of the second display apparatus 100B will be omitted.

The prism 10 of the projection see-through device 70 is an arc-shaped member that is bent along a face in a planar view, and may include a first prism portion 11 at a central side close to a nose, and a second prism portion 12 at a peripheral side distant from the nose. The first prism portion 11 is located on a light exiting side, and includes a first surface S11, a second surface S12 and a third surface S13 as a side surface having an optical function, and the second prism portion 12 is located on a light incident side, and includes a fourth surface S14, a fifth surface S15 and a sixth surface S16 as a side surface having an optical function. Here, the first surface S11 is adjacent to the fourth surface S14, the third surface S13 is adjacent to the fifth surface S15, the second surface S12 is located between the first surface S11 and the third surface S13, and the sixth surface S16 is located between the fourth surface S14 and the fifth surface S15. Further, the prism 10 includes the first side surface 10e and a second side surface 10f that are adjacent to the first to sixth surfaces S11 to S16 and are opposite to each other.

In the prism 10, the first surface S11 is a free-form surface in which an exiting side optical axis AXO parallel to a Z axis is used as a central axis or a reference axis, the second surface S12 is a free-form surface in which an optical axis AX1 that is included in a reference plane SR parallel to an XY plane and is inclined to the Z axis is used as a central axis or a reference axis, and the third surface S13 is a free-form surface in which the exiting side optical axis AXO is used as a central axis or a reference axis. The fourth surface S14 is a free-form surface in which a bisector of a pair of optical axes AX3 and AX4 that is included in the reference plane SR parallel to an XZ plane and is inclined to the Z axis is used as a central axis or a reference axis. The fifth surface S15 is a free-form surface in which a bisector of a pair of optical axes AX4 and AX5 that is included in the reference plane SR parallel to the XZ plane and is inclined to the Z axis is used as a central axis or a reference axis. The sixth surface S16 is a free-form surface in which the optical axis AX4 that is included in the reference plane SR parallel to the XZ plane and is inclined to the Z axis is used as a central axis or a reference axis. The first to sixth surfaces S11 to S16 have symmetric shapes with respect to the vertical (or longitudinal) Y axis direction with reference to the reference plane SR that extends in the horizontal (or transverse) direction and is parallel to the XZ plane, through which the optical axes AX1 to AX4 and the like pass.

The prism 10 is formed of a resin material having high light permeability in a visible range, and is molded by injecting and solidifying a thermoplastic resin in a mold, for example. A main portion 10s of the prism 10 is an integrally formed component, and may be divided into the first prism portion 11 and the second prism portion 12. The first prism portion 11 enables wave guide and exit of image light GL and enables see-through of external light HL. The second prism portion 12 enables incidence and wave guide of the image light GL.

In the first prism portion 11, the first surface S11 functions as a refractive surface on which the image light GL exits to the outside of the first prism portion 11, and also functions as a total reflective surface on which the image light GL is totally reflected on an inner surface side thereof. The first surface S11 is disposed in front of an eye EY, and has a concave shape with respect to an observer. The first surface S11 may be coated on the main portion 10s as a hard coating layer in order to prevent front surface damage and image resolution reduction. The hard coating layer is formed by depositing a coating agent formed of a resin or the like on a base surface of the main portion 10s by a dipping process or a spray coating process.

The second surface S12 includes a half mirror layer 15. The half mirror layer 15 is a reflective film (that is, a semitransparent reflective film) having light permeability. The half mirror layer (the semitransparent reflective film) 15 is not formed on the overall area of the second surface S12, but is formed on a partial area PA thereof. That is, the half mirror layer 15 is formed on the partial area PA obtained by mainly narrowing an overall area QA where the second surface S12 is enlarged in a vertical direction. More specifically, the partial area PA is located on the central side in the vertical Y axis direction, and is appropriately generally located in a direction along the horizontal reference plane SR. The half mirror layer 15 is formed by depositing a metal reflective film or a dielectric multilayer on the partial area PA of the base surface of the main body portion 10s. The reflectance of the half mirror layer 15 to the image light GL is set to 10% or higher and 50% or lower in an incident angle range of the image light GL estimated from the viewpoint of making easy observation of the external light HL in a see-through manner. According to a specific example, the reflectance of the half mirror layer 15 to the image light GL is set to 20%, for example, and the transmittance of the image light GL is set to 80%, for example.

The third surface 813 functions as a total reflective surface on which the image light GL is totally reflected on the inner surface side. The third surface S13 may be coated on the main portion 10s as a hard coating layer in order to prevent front surface damage and image resolution reduction. The third surface S13 is disposed in front of the eye EY, and has a concave shape with respect to the observer similarly to the first surface S11. When the external light HL is viewed after passing through the first surface S11 and the third surface S13, diopter is about 0.

In the second prism portion 12, the fourth surface S14 and the fifth surface S15 function as a total reflective surface on which the image light GL is totally reflected on the inner surface side, or are coated by a mirror layer 17 and function as a reflective surface. In a case where the fourth surface S14 and the fifth surface S15 function as the total reflective surface, the main portion 10s may be coated by a hard coating layer in order to prevent front surface damage and image resolution reduction.

The sixth surface S16 functions as a refractive surface on which the image light GL is incident on the second prism portion 12. The sixth surface S16 may be coated on the main portion 10s as a hard coating layer in order to prevent front surface damage and image resolution reduction, and the main portion 10s may be coated by a multilayer in order to suppress ghost due to reflection prevention.

The light transmitting member 50 is integrally fixed to the prism 10. The light transmitting member 50 is a member (auxiliary prism) that supports a see-through function of the prism 10, and includes a first transmission surface S51, a second transmission surface S52, and a third transmission surface S53 as a side surface that includes an optical function. Here, the second transmission surface S52 is disposed between the first transmission surface S51 and the third transmission surface S53. The first transmission surface S51 is disposed on a curved surface that extends from the first surface S11 of the prism 10, the second transmission surface S52 is a curved surface that is bonded to the second surface S12 by an additive agent CC to be integrated, and the third transmission surface S53 is disposed on a curved surface that extends from the third surface S13 of the prism 10. Here, since the second transmission surface S52 and the second surface S42 of the prism 10 are integrated by bonding, the second transmission surface S52 and the second surface S42 have approximately the same curvature shape.

The light transmitting member 50 (auxiliary prism) is formed of a resin material that shows high light permeability in a visible range and has approximately the same refractive index as that of the main portion 10s of the prism 10. The light transmitting member 50 is formed by molding of a thermoplastic resin, for example.

The projection lens 30 is retained in a lens tube 62, and the image display device 80 is fixed to an end of the lens tube 62. The second prism portion 12 of the prism 10 is connected to the lens tube 62 that retains the projection lens 30 and indirectly supports the projection lens 30 and the image display device 80. A light incidence side of the prism 10 is covered by a light blocking member 63 together with the projection lens 30 and the like. An upper end portion or a lower end portion of the prism 10 is covered by the light blocking member 63. An additional light blocking portion that prevents external light from being incident onto the prism 10 may be provided around the prism 10. The light blocking portion may be configured by a light blocking coating or a light scattering layer, for example.

The projection lens 30 includes three lenses 31, 32 and 33, for example, along an incident side optical axis AXI. The respective lenses 31, 32 and 33 are axisymmetric lenses, and at least one thereof has an aspheric surface. The projection lens 30 allows the image light GL emitted from the image display device 80 to be incident onto the prism 10 through the sixth surface S16 of the prism 10 for re-imaging. That is, the projection lens 30 is a relay optical system for re-imaging the image light output from each point on an image surface (display position) OI of the image display element 82 in the prism 10. Each surface of the prism 10 functions as a part of the relay optical system in cooperation with the projection lens 30.

The image display device 80 includes an illumination device 81 that emits two-dimensional illumination light SL, the image display element 82 that is a transmissive spatial optical modulation device, and a driving control unit 84 that controls operations of the illumination device 81 and the image display element 82.

The illumination device 81 of the image display device 80 includes a light source 81a that generates light including three colors of red, green and blue, and a backlight light-guiding portion 81b that diffuses the light from the light source 81a and converts this light into a light flux having a rectangular cross-section. The image display element 82 is an image element formed by a liquid crystal display device, for example, and spatially modulates illumination light SL emitted from the illumination device 81 to form image light, which is an object to be displayed, such as a moving picture. The driving control unit 84 includes a light source driving circuit 84a and a liquid crystal driving circuit 84b. The light source driving circuit 84a supplies electric power to the light source 81a of the illumination device 81 and emits the illumination light SL with a stable brightness. The liquid crystal driving circuit 84b outputs an image signal or a driving signal to the image display element (image element) 82 to form colored-image light that is a basis of a moving picture or a still image as a transmittance pattern. In addition, the liquid crystal driving circuit 84b may be provided with an image processing function, but the image processing function may be provided in a control circuit that is externally provided.

C. Optical Path of Image Light or the Like

Hereinafter, the optical path of the image light GL or the like in the virtual image display apparatus 100 will be described.

The image light GL emitted from the image display element (image element) 82 is incident onto the sixth surface S16 having a relatively strong positive refractive power provided in the prism 10 while being converged by the projection lens 30.

The image light GL, which is passed through the sixth surface S16 of the prism 10, advances while being converged. When passing through the second prism portion S12, the image light GL is reflected on the fifth surface S15 having a relatively weak positive refractive power, and is reflected on the fourth surface S14 having a relatively weak negative refractive power.

The image light GL reflected on the fourth surface S14 of the second prism portion 12 is incident onto the third surface S13 having a relatively weak positive refractive power to be totally reflected thereon in the first prism portion 11, and is incident onto the first surface S11 having a relatively weak negative refractive power to be totally reflected thereon. The image light GL forms an intermediate image in the prism 10 before and after passing through the third surface S13. An image surface II of the intermediate image corresponds to an image surface (display position) OI of the image display element 82, but is turned back on the third surface S13.

The image light GL that is totally reflected on the first surface S11 is incident onto the second surface S12, but particularly, the image light GL incident onto the half mirror layer 15 is partially reflected while partially passing through the half mirror layer 15, and is incident again onto the first surface S11 to pass therethrough. The half mirror layer 15 has a relatively strong positive refractive power with respect to the reflected image light GL. Further, the first surface S11 has a negative refractive power with respect to the image light GL passing therethrough.

The image light GL passed through the first surface 311 is incident onto a pupil of the eye EY of the observer as an approximately parallel light flux. That is, the observer observes the image formed on the image display element 82 by the image light GL that is a virtual image.

On the other hand, light that is incident onto a +X side from the second surface S12 of the prism 10 in the external light HL passes through the third surface S13 and the first surface S11 in the first prism portion 11. At this time, positive and negative refractive powers cancel out, and aberration is also corrected. That is, the observer observes an external image having less warp through the prism 10. Similarly, when light that is incident onto a −X side from the second surface S12 of the prism 10, that is, light that is incident onto the light transmitting member 50 in the external light HL passes through the third transmission surface S53 and the first transmission surface S51 provided therewith, positive or negative refractive powers cancel out, and aberration is also corrected. That is, the observer observes an external image with less warp through the light transmitting member 50. Further, when light incident onto the light transmitting member 50 corresponding to the second surface S12 of the prism 10 in the external light HL passes through the third transmission surface S53 and the first surface S11 provided therewith, positive or negative refractive powers cancel out, and aberration is also corrected. That is, the observer observes an external image with less distortion through the light transmitting member 50. The second surface S12 of the prism 10 and the second transmission surface S52 of the light transmitting member 50 have approximately the same curved surface shapes, have approximately the same refractive indexes, and a gap therebetween is filled by the adhesive layer CC having approximately the same refractive index. That is, the second surface S12 of the prism 10 or the second transmission surface S52 of the light transmitting member 50 does not function as a refractive surface with respect to the external light HL.

However, since the external light HL incident onto the half mirror layer 15 is partially reflected while partially passing through the half mirror layer 15, the external light HL in a direction corresponding to the half mirror layer 15 is weakened due to the transmittance of the half mirror layer 15. On the other hand, since the image light GL is incident in the direction corresponding to the half mirror layer 15, the observer observes the image formed on the image display element 82 in the direction of the half mirror layer 15 and the external image.

Among the image light GL that is propagated in the prism 10 and is incident onto the second surface S12, light that is not reflected on the half mirror layer 15 is incident on the light transmitting member 50. Here, the light is prevented from being returned to the prism 10 by an antireflection portion (not shown) provided in the light transmitting member 50. That is, the image light GL passed through the second surface S12 is prevented from being returned onto the optical path to be stray light. Further, the external light HL that is incident from the side of the light transmitting member 50 and is reflected on the half mirror layer 15 is returned to the light transmitting member 50, and is prevented from being output to the prism 10 by the antireflection portion (not shown) provided in the light transmitting member 50. That is, the external light HL that is reflected on the half mirror layer 15 is prevented from being returned on the optical path to be stray light.

D. Method of Defining Optical Surface or Optical Path

Figure 4:
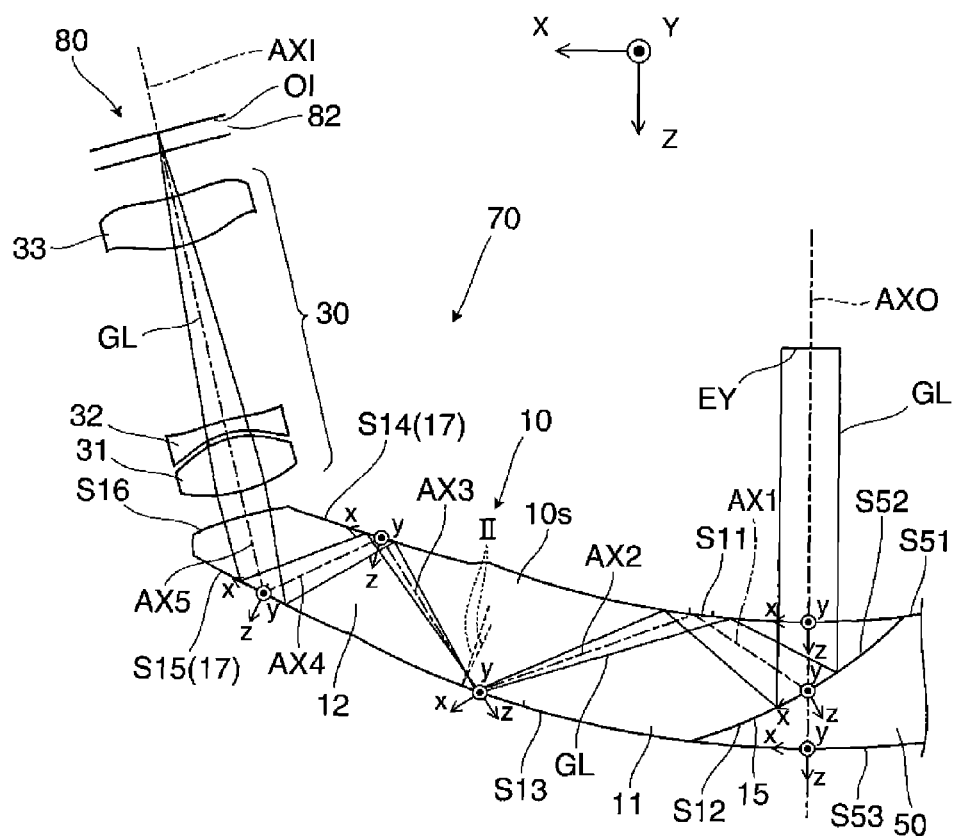
FIG. 4 is a cross-sectional view illustrating an optical surface and an optical path in a prism in the first display apparatus.

FIG. 4 is a diagram illustrating optical axes AX1 to AX4 or local coordinates in the prism 10. In the following description, the optical surface or the optical path is regulated in a reversing direction toward the image display element 82 of the image display device 80 from the eye EY of the observer, in view of evaluation of the optical system or convenience of expression. In an actual optical system, light emitted from the image display element 82 sequentially passes through the projection lens 30 and the prism 10 to reach the eye EY, but it is difficult to perform evaluation of the optical system in this state. Thus, light from an infinitely distant light source through a stop that is located at the position of the eye EY enters the prism 10 to be imaged in the image display element 82 through the projection lens 30, to thereby perform evaluation and design. Data on the optical system to be described later is expressed in that order. The light transmitting member 50 that is bonded to the prism 10 to be integrally used extends from the shape of the prism 10, and its description will be omitted.

In the prism 10 shown in the figure, an optical axis of the first surface S11 coincides with the exiting side optical axis AXO, and local coordinates (x, y, z) of the first surface S11 has the origin on the first surface S11 in a translation relationship with overall coordinates (X, Y, Z). That is, a z direction of the local coordinates is an advancing direction (reversing direction of light beam) on the exiting side optical axis AXO, and a y direction of the local coordinates is in parallel with a Y direction of the overall coordinates. On each subsequent surface, a y direction of the local coordinates is in parallel with the Y direction of the overall coordinates.

An optical axis of the second surface S12 is appropriately inclined with respect to the exiting side optical axis AXO, and local coordinates of the second surface S12 appropriately rotate and translate around a Y axis with respect to the overall coordinates and have the origin on the second surface S12. A z direction of the local coordinates of the second surface S12 is set to an intermediate direction between the exiting side optical axis AXO and the optical axis AX1 at the center of light flux toward the first surface S11 from the second surface S12.

An optical axis of the third surface S13 coincides with the exiting side optical axis AXO, and local coordinates of the third surface S13 have the origin on an extension surface of the third surface S13, that is, the third transmission surface S53, in a translation relationship with the overall coordinates.

As described above, an intermediate direction between the optical axis AX1 at the center of the light flux toward the first surface S11 from the second surface S12 and the optical axis AX2 at the center of the light flux toward the third surface S13 from the first surface S11 coincides with a normal direction of the first surface S11 at the center (intersection point of the optical axes AX1 and AX2) of the light flux on the first surface S11. Further, an intermediate direction between the optical axis AX2 at the center of the light flux toward the third surface S13 from the first surface S11 and the optical axis AX3 at the center of the light flux toward the fourth surface S14 from the third surface S13 coincides with a normal direction of the third surface S13 at the center (intersection point of the optical axes AX2 and AX3) of the light flux on the third surface S13.

In an optical path toward the next fourth surface S14 from the third surface S13, the local coordinates correspond to the advancing direction (reversing direction of light beam). That is, a z direction of the local coordinates from the third surface S13 to the fourth surface S14 coincides with the optical axis AX3 at the center of the light flux, and a y direction of the local coordinates is in parallel with the Y direction of the overall coordinates.

The origin of the local coordinates of the fourth surface S14 is located on the fourth surface S14. Further, a z direction of the local coordinates of the fourth surface S14, that is, an optical axis of the fourth surface S14 corresponds to a bisector between the optical axis AX3 at the center of the light flux toward the fourth surface S14 from the third surface S13 and the optical axis AX4 at the center of the light flux toward the fifth surface S15 from the fourth surface S14.

The origin of the local coordinates of the fifth surface S15 is located on the fifth surface S15. Further, a z direction of the local coordinates of the fifth surface S15, that is, an optical axis of the fifth surface S15 corresponds to a bisector between the optical axis AX4 at the center of the light flux toward the fifth surface S15 from the fourth surface S14 and the optical axis AX5 at the center of the light flux toward the sixth surface S16 from the fifth surface S15.

The optical axis of the sixth surface S16 coincides with the optical axis AX5, and coincides with the incident side optical axis AXI that extends from the image display device 80.

E. Preferable Characteristics of Optical Surface

The shape of the first surface S11 of the prism 10 is expressed as the following formula (4) using the local coordinates (x, y, z) of the first surface S11 where $A1_{m,n}$ represents a coefficient of the term of m·n in a polynomial expansion, and m and n represent an integer of 0 or greater.

$$z = \Sigma\{A1_{m,n} \cdot (x^m \cdot y^n)\} \quad (4)$$

The shape of the second surface S12 of the prism 10 is expressed as the following formula (5) using the local coordinates (x, y, z) of the second surface S12 where $A2_{m,n}$ represents a coefficient of the term of m·n in a polynomial expansion.

$$z = \Sigma\{A2_{m,n} \cdot (x^m \cdot y^n)\} \quad (5)$$

The shape of the third surface S13 of the prism 10 is expressed as the following formula (6) using the local coordinates (x, y, z) of the third surface S13 where $A3_{m,n}$ represents a coefficient of the term of m·n in a polynomial expansion.

$$z = \Sigma\{A3_{m,n} \cdot (x^m \cdot y^n)\} \quad (6)$$

In the present embodiment, the first to third surfaces S11 to S13 of the prism 10 satisfy three conditions as follows.

$$-5 \times 10^{-2} < A1_{2,0} + A1_{0,2} < -1 \times 10^{-3} \text{ and}$$

$$-5 \times 10^{-2} < A3_{2,0} + A3_{0,2} < -1 \times 10^{-3} \quad (1)$$

$$|A3_{2,0} - A3_{0,2}| < 1 \times 10^{-2} \quad (2)$$

$$|A1_{2,0} - A3_{2,0}| < 5 \times 10^{-3} \text{ and}$$

$$|A1_{0,2} - A3_{0,2}| < 5 \times 10^{-3} \quad (3)$$

By setting the shapes of the first to third surfaces S11 to S13 in order to satisfy these three conditions, aberration corrections of both of the external light HL and the image light GL are preferably performed, thereby achieving superior image quality.

An interval between the first surface S11 and the third surface S13 in the prism 10 is set to 5 mm or more and 15 mm or less. Further, an inclination angle of the second surface S12 with respect to the first surface S11 is set to 20° or more and 40° or less.

The fourth surface S14 or the fifth surface S15 in the prism 10 is provided for optical path adjustment or more accurate aberration correction, and may be omitted in consideration of a specification or the like of the projection see-through device 70.

In the virtual image display apparatus 100 according to the present embodiment, an intermediate image is formed inside the prism 10 by the projection lens 30 or the like, and the image light GL that is totally reflected on two or more surfaces in the order of the third surface S13, the first surface S11 and the second surface S12 passes through the first surface S11 to reach the eye EY of the observer. Thus, it is possible to reduce the size and weight of the entire optical system by making the thickness of the prism 10 thin and to realize a bright high-performance display with a wide viewing angle. Further, for example, it is possible to allow the external light HL to pass through the first surface S11 and the third surface S13 for observation. Further, since diopter at that time is set to about 0, it is possible to reduce defocusing or warp of the external light HL when the external light HL is observed in a see-through manner. Further, the prism 10 has a shape along the face of the observer, the center of gravity is close to the face, and superior design may be achieved.

EXAMPLES

Hereinafter, examples of the projection see-through device assembled in the virtual image display apparatus according to the invention will be described. Signs used in each example are shown hereinafter.

SPH: Pupil

FFSk: Free-form surface (k in prism=surface number)

ASPk: axisymmetric aspheric surface (k in projection optical system=surface number)

SPH: Spherical surface or flat surface (protection glass surface)

R: Radius of curvature

T: Axial surface interval

Nd: Refractive index of optical material with respect to line d

Vd: Abbe number of optical material relating to line d

TLY: inclination angle (°) of optical axis on cross section (XZ section) of specific surface (TLY may vary before and after specific surface)

DCX: deviation of optical axis in X axis direction on cross section (XZ section) of specific surface Example 1

In a projection see-through device of Example 1, data on an optical surface that forms a prism and a projection lens is shown in Table 1. For example, FFS1 represents the first surface S11, FFS2 represents the second surface S12, and FFS3 represents the third surface S13. Further, ASP1 represents an exiting surface of a first lens of the projection lens, and ASP2 represents an incident surface of the first lens.

TABLE 1

| No | Type | R | T | Nd | Vd |
|---|---|---|---|---|---|
| 1 | SPH | ∞ | 22.00 | | |
| 2 | FFS1 | −76.789 | 5.50 | 1.525 | 55.95 |
| 3 | FFS2 | −45.250 | −5.50 | 1.525 | 55.95 |
| 4 | FFS1 | −76.789 | 10.00 | 1.525 | 55.95 |
| 5 | FFS3 | −86.789 | −20.00 | 1.525 | 55.95 |
| 6 | FFS4 | −152.636 | 11.00 | 1.525 | 55.95 |
| 7 | FFS5 | −104.492 | −6.50 | 1.525 | 55.95 |
| 8 | FFS6 | 38.430 | −2.00 | | |
| 9 | ASP1 | −11.866 | −4.38 | 1.525 | 55.95 |
| 10 | ASP2 | 7.425 | −0.50 | | |
| 11 | ASP3 | 6.090 | −1.00 | 1.585 | 29.90 |
| 12 | ASP4 | 22.664 | −14.55 | | |
| 13 | ASP5 | −8.433 | −4.00 | 1.525 | 55.95 |
| 14 | ASP6 | −17.659 | −3.73 | | |
| 15 | SPH | ∞ | −1.60 | 1.458 | 67.82 |
| 16 | image surface | | | | |

With respect to the optical surface in the prism that forms Example 1, the optical axis inclination angle (tilt) TLY on the cross section and the optical axis deviation (decenter) DCX are shown in Table 2.

TABLE 2

| No | Type | TLY (before surface) | DCX (after surface) | TLY (after surface) |
|---|---|---|---|---|
| 2 | FFS1 | 0 | 0 | 0 |
| 3 | FFS2 | −29 | 0 | 29 |
| 4 | FFS1 | 0 | 0 | 0 |
| 5 | FFS3 | 0 | 25.03 | −34.6 |
| 6 | FFS4 | 50 | 0 | 50 |
| 7 | FFS5 | −40 | 0 | −40 |
| 8 | FFS6 | 0 | 0 | 0 |

With respect to each optical surface in the prism that forms Example 1, a coefficient $AK_{m,n}$ in a polynomial expansion of a free-form surface is shown in Table 3 below. In Table 3, signs m and n represent variables or degrees in the coefficient $AK_{m,n}$. Further, the sign FFSk (k=1 to 6) represents a k-th surface among the first to sixth surfaces S11 to S16 that are free-form surfaces. The coefficient $AK_{m,n}$ represents a coefficient of each term $x^m \cdot y^n$ that forms the polynomial expression indicating the k-th surface that is an object.

TABLE 3

| m | n | FFS1 | FFS2 | FFS3 | FFS4 | FFS5 | FFS6 |
|---|---|---|---|---|---|---|---|
| 2 | 0 | −6.511E−03 | −1.105E−02 | −5.761E−03 | −3.276E−03 | −4.785E−03 | 1.301E−02 |
| 0 | 2 | −8.627E−03 | −1.071E−02 | −7.877E−03 | −3.259E−02 | −1.515E−02 | 1.059E−02 |
| 3 | 0 | 7.870E−05 | 4.763E−05 | 7.870E−05 | −2.134E−05 | 9.806E−05 | 3.355E−05 |
| 1 | 2 | −2.001E−04 | −8.770E−05 | −2.001E−04 | 9.492E−04 | −1.050E−04 | −1.237E−03 |
| 4 | 0 | −4.670E−07 | −5.173E−06 | −4.670E−07 | 2.717E−05 | 2.953E−05 | 1.435E−04 |
| 2 | 2 | 2.280E−05 | 2.413E−06 | 2.280E−05 | 4.420E−05 | 1.214E−05 | −1.302E−04 |
| 0 | 4 | 1.639E−05 | 9.860E−07 | 1.639E−05 | 3.467E−04 | 1.944E−05 | −6.456E−05 |
| 5 | 0 | −1.464E−07 | 3.652E−07 | −1.464E−07 | −7.465E−07 | 2.234E−06 | 3.447E−05 |
| 3 | 2 | −3.283E−06 | −1.491E−07 | −3.283E−06 | −1.238E−05 | −1.560E−06 | 9.562E−06 |
| 1 | 4 | −7.503E−06 | −1.165E−06 | −7.503E−06 | −6.219E−05 | −3.090E−06 | −1.099E−05 |
| 6 | 0 | 1.404E−09 | −9.846E−09 | 1.404E−09 | −2.716E−07 | 7.773E−08 | −3.239E−06 |
| 4 | 2 | 1.092E−06 | 3.431E−08 | 1.092E−06 | −1.125E−06 | −3.354E−07 | −5.077E−06 |
| 2 | 4 | 7.458E−07 | 1.637E−07 | 7.458E−07 | 2.079E−06 | −4.320E−07 | −8.780E−06 |
| 0 | 6 | −5.667E−07 | −8.426E−08 | −5.667E−07 | 4.332E−06 | 1.343E−07 | −1.682E−06 |

In Table 3 and subsequent tables, a numerical value E and thereafter represents an exponent of a decimal number, and for example, "−6.511E−03" represents $-6.511 \times 10^{-03}$.

Coefficients of an aspheric surface of the optical surface that forms the projection lens in the projection see-through device of Example 1 are shown in Table 4.

TABLE 4

| | ASP1 | ASP2 | ASP3 | ASP4 | ASP5 | ASP6 |
|---|---|---|---|---|---|---|
| K | 0 | 0 | 0 | 0 | 0 | 0 |
| B4 | −5.974E−05 | −6.031E−05 | −1.068E−03 | −8.277E−04 | 6.835E−04 | 5.660E−04 |
| B6 | −3.481E−07 | −3.703E−05 | −4.617E−05 | −4.824E−06 | −1.131E−06 | 1.494E−05 |
| B8 | 1.918E−07 | 6.165E−07 | 5.247E−07 | 7.186E−08 | 2.283E−07 | −1.285E−07 |

In Table 4, references K and Bi represent coefficients for specifying aspheric surfaces of aspheric surfaces APS1 to APS6 that are lens surfaces of three lenses 31, 32 and 33 that form the projection lens 30. The aspheric surface is specified by the following polynomial expression (aspheric surface expression).

$$z = \frac{(1/R) \times h^2}{1 + \sqrt{1 - (K+1) \times (1/R)^2 \times h^2}} + B_4 h^4 + B_6 h^6 + B_8 h^8 + \ldots$$

Here, R represents a radius of curvature of each surface, h represents the height from the optical axis, K represents a conical coefficient of a lens surface that is an object, and Bi (i=4, 6, 8, . . . ) represents a high-order aspheric surface coefficient of the lens surface that is the object.

Figure 5:
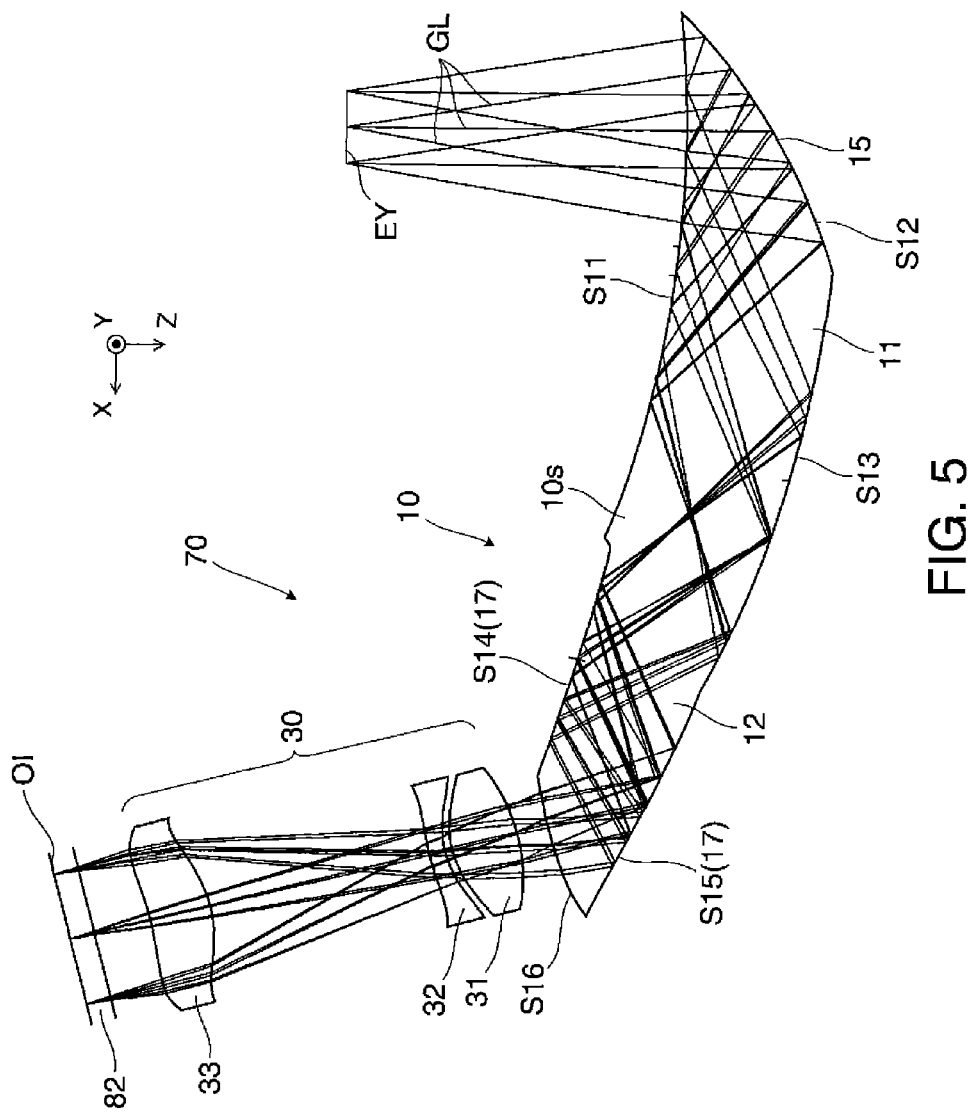
FIG. 5 is a diagram illustrating an optical system according to Example 1.

FIG. 5 is a cross sectional view illustrating the projection see-through device 70 of Example 1. Here, the light flux is deviated on the reference plane SR and is also deviated in the Y direction from the reference plane SR. The prism 10 in the projection see-through device 70 includes the first surface S11 having a weak negative refractive power, the second surface S12 having a relatively strong positive refractive power, the third surface S13 having a relatively weak positive refractive power, the fourth surface S14 having a relatively weak negative refractive power, the fifth surface S15 having a relatively weak positive refractive power, and the sixth surface S16 having a relatively strong positive refractive power. The projection lens 30 includes the first lens 31 having a positive refractive power, the second lens 32 having a negative refractive power, and the third lens 33 having a positive refractive power. A specific specification of the optical system of Example 1 is as follows. That is, a horizontal viewing angle is 20.1°, a vertical viewing angle is 11.4°, the size of a display area of the image display element is 9.22 mm×5.18 mm, a pupil diameter is 5 mm, and a focal distance is about 26 mm.

Figure 6A:
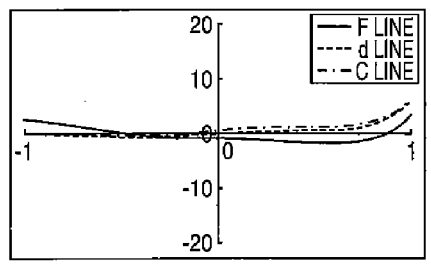
FIGS. 6A to 6F are diagrams illustrating aberrations of the optical system according to Example 1.
Figure 6D:
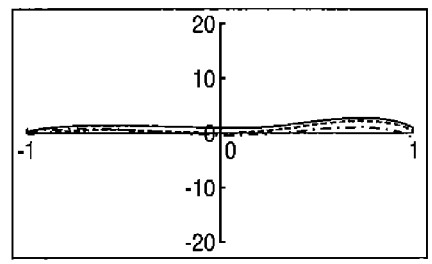
Figure 6B:
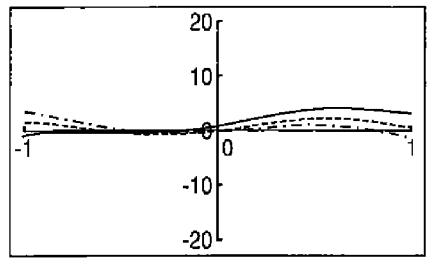
Figure 6E:
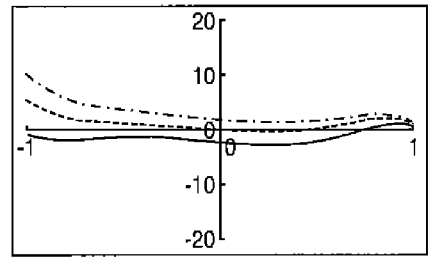
Figure 6C:
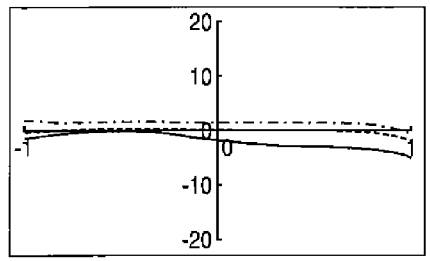
Figure 6F:
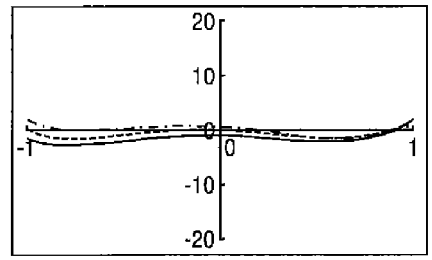
Figure 7A:
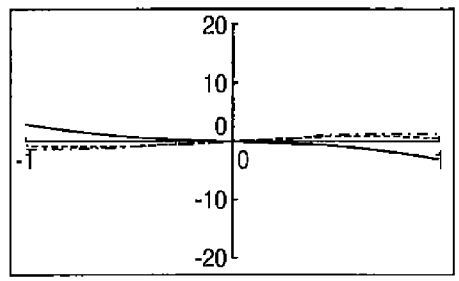
FIGS. 7A to 7F are diagrams illustrating aberrations of the optical system according to Example 1.
Figure 7B:
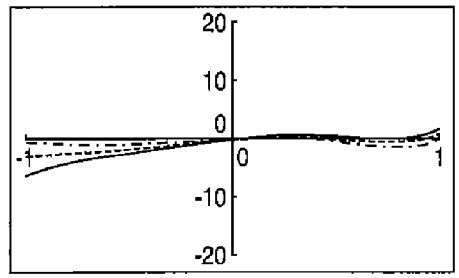
Figure 7C:
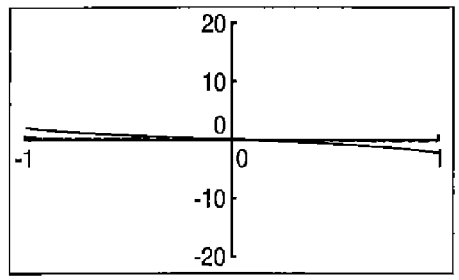
Figure 7D:
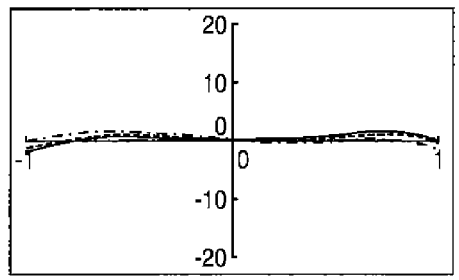
Figure 7E:
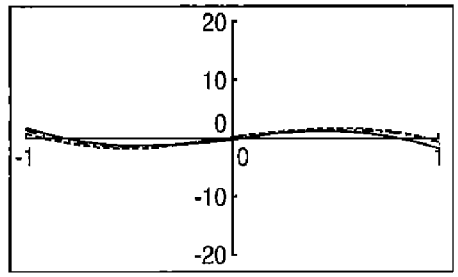
Figure 7F:
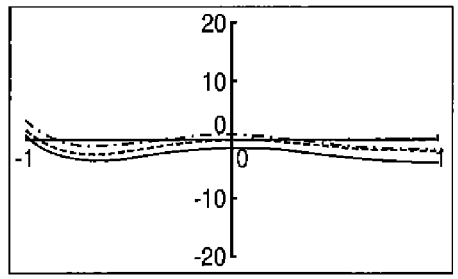

FIGS. 6A to 6F and FIGS. 7A to 7F show aberrations of Example 1. In each aberration diagram, the horizontal axis shows a pupil position, and the vertical axis shows the amount of aberrations in the unit of micron. Specifically, FIGS. 6A and 6B show aberrations in the Y and X directions at an azimuth of 10° in the X direction and 5.7° in the Y direction, FIGS. 6C and 6D show aberrations in the Y and X directions at an azimuth of 0.0° in the X direction and 5.7° in the Y direction, and FIGS. 6E and 6F show aberrations in the Y and X directions at an azimuth of −10° in the X direction and 5.7° in the Y direction. FIGS. 7A and 7B show aberrations in the Y and X directions at an azimuth of 10° in the X direction and 0.0° in the Y direction, FIGS. 7C and 7D show aberrations in the Y and X directions at an azimuth of 0.0° in the X direction and 0.0° in the Y direction, and FIGS. 7E and 7F show aberrations in the Y and X directions at an azimuth of −10° in the X direction and 0.0° in the Y direction. The amount of aberration shown in the drawing represents the amount of aberration on the image surface of the image display element in a case where a light beam is reversed for convenience.

Example 2

In a projection see-through device of Example 2, data on an optical surface that forms a prism and a projection lens is shown in Table 5.

TABLE 5

| No | Type | R | T | Nd | Vd |
|---|---|---|---|---|---|
| 1 | SPH | ∞ | 22.00 | | |
| 2 | FFS1 | −121.658 | 5.50 | 1.525 | 55.95 |
| 3 | FFS2 | −49.762 | −5.50 | 1.525 | 55.95 |
| 4 | FFS1 | −121.658 | 10.00 | 1.525 | 55.95 |
| 5 | FFS3 | −131.658 | −20.00 | 1.525 | 55.95 |
| 6 | FFS4 | −148.187 | 14.00 | 1.525 | 55.95 |
| 7 | FFS5 | −193.512 | −10.00 | 1.525 | 55.95 |

TABLE 5-continued

| No | Type | R | T | Nd | Vd |
|---|---|---|---|---|---|
| 8 | FFS6 | 16.102 | −2.00 | | |
| 9 | ASP1 | −20.674 | −7.00 | 1.525 | 55.95 |
| 10 | ASP2 | 9.056 | −0.50 | | |
| 11 | ASP3 | 7.190 | −1.00 | 1.585 | 29.90 |
| 12 | ASP4 | 54.244 | −19.37 | | |
| 13 | ASP5 | −10.384 | −8.15 | 1.525 | 55.95 |
| 14 | ASP6 | −23.928 | −4.98 | | |
| 15 | SPH | ∞ | −1.60 | 1.458 | 67.82 |
| 16 | image surface | | | | |

With respect to the optical surface in the prism that forms Example 2, the optical axis inclination angle (tilt) TLY on the cross section and the optical axis deviation (decenter) DCX are shown in Table 6.

TABLE 6

| No | Type | TLY (before surface) | DCX (after surface) | TLY (after surface) |
|---|---|---|---|---|
| 2 | FFS1 | 0 | 0 | 0 |
| 3 | FFS2 | −29 | 0 | 29 |
| 4 | FFS1 | 0 | 0 | 0 |
| 5 | FFS3 | 0 | 24.171 | −39.58 |
| 6 | FFS4 | 50 | 0 | 50 |
| 7 | FFS5 | −50 | 0 | −50 |
| 8 | FFS6 | 0 | 0 | 0 |

With respect to each optical surface in the prism that forms Example 2, a coefficient in a polynomial expansion of a free-form surface is shown in Table 7. In Table 7, signs m and n represent variables or degrees in the coefficient $AK_{m,n}$. Further, the sign FFSk (k=1 to 6) represents a k-th surface among the first to sixth surfaces S11 to S16 that are free-form surfaces.

TABLE 7

| m | n | FFS1 | FFS2 | FFS3 | FFS4 | FFS5 | FFS6 |
|---|---|---|---|---|---|---|---|
| 2 | 0 | −4.110E−03 | −1.005E−02 | −3.798E−03 | −3.374E−03 | −2.584E−03 | 3.105E−02 |
| 0 | 2 | −6.261E−03 | −1.022E−02 | −5.949E−03 | −2.723E−02 | 5.720E−03 | 3.039E−02 |
| 3 | 0 | 1.513E−05 | 8.269E−06 | 1.513E−05 | 4.878E−05 | 5.891E−06 | 5.084E−05 |
| 1 | 2 | −8.802E−06 | −4.719E−05 | −8.802E−06 | 1.315E−03 | 1.092E−04 | −4.205E−04 |
| 4 | 0 | −3.283E−07 | −2.484E−06 | −3.283E−07 | 1.997E−05 | 8.630E−06 | 3.586E−05 |
| 2 | 2 | 1.110E−05 | −2.325E−07 | 1.110E−05 | 5.553E−05 | 1.338E−05 | −7.045E−05 |
| 0 | 4 | −1.231E−05 | −3.745E−06 | −1.231E−05 | 1.172E−04 | 4.272E−06 | −6.522E−05 |
| 5 | 0 | −7.697E−08 | 7.994E−08 | −7.697E−08 | −7.495E−07 | 3.889E−07 | 1.241E−05 |
| 3 | 2 | −1.577E−06 | −5.251E−08 | −1.577E−06 | −1.319E−05 | −6.510E−07 | 5.310E−06 |
| 1 | 4 | −1.721E−06 | 6.772E−08 | −1.721E−06 | −2.496E−05 | −1.061E−06 | −1.205E−06 |
| 6 | 0 | 1.800E−09 | 2.414E−09 | 1.800E−09 | −1.502E−07 | 1.016E−09 | 1.206E−06 |
| 4 | 2 | 1.544E−08 | 3.116E−08 | 1.544E−08 | −1.443E−07 | 2.158E−09 | 3.052E−06 |
| 2 | 4 | 2.672E−08 | 7.908E−09 | 2.672E−08 | 1.848E−06 | 7.531E−08 | 2.561E−06 |
| 0 | 6 | 3.158E−07 | 9.774E−10 | 3.158E−07 | 3.779E−06 | 1.021E−07 | 9.437E−07 |

Coefficients of an aspheric surface of the optical surface that forms the projection lens in the projection see-through device of Example 2 are shown in Table 8.

TABLE 8

| | ASP1 | ASP2 | ASP3 | ASP4 | ASP5 | ASP6 |
|---|---|---|---|---|---|---|
| K | 0 | 0 | 0 | 0 | 0 | 0 |
| B4 | −2.343E−05 | −2.140E−03 | −6.380E−04 | −1.244E−04 | 2.638E−04 | 1.289E−04 |
| B6 | 1.019E−06 | −6.197E−06 | −1.496E−05 | −6.791E−06 | 7.578E−07 | 9.812E−06 |
| B8 | 5.340E−08 | −9.118E−08 | −1.696E−07 | −2.134E−08 | 1.763E−08 | −1.069E−07 |

In Table 8, references K and Bi represent coefficients for specifying aspheric surfaces of aspheric surfaces APS1 to APS6 that are lens surfaces of three lenses 31, 32 and 33 that form the projection lens 30.

Figure 8:
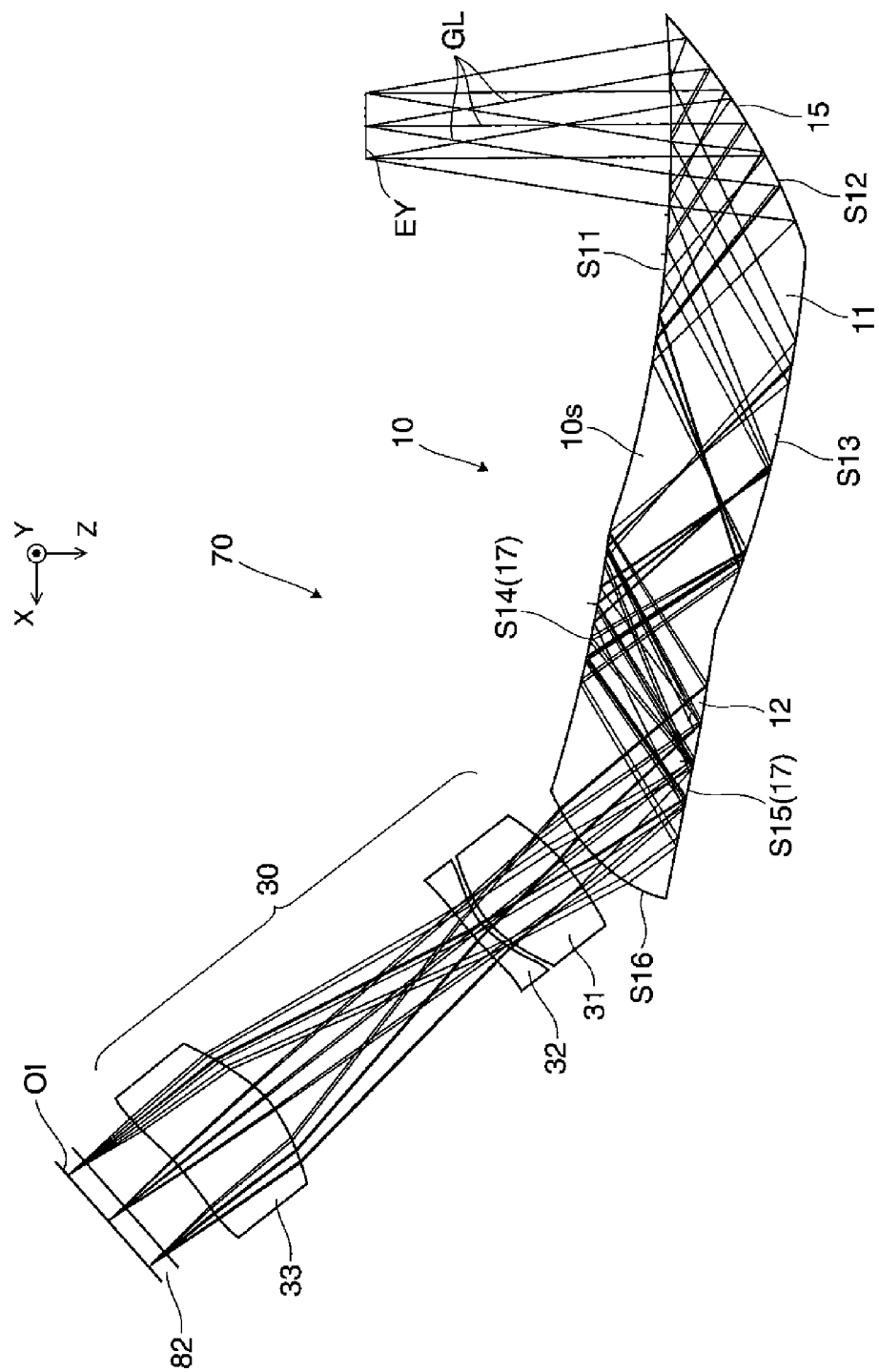
FIG. 8 is a diagram illustrating an optical system according to Example 2.

FIG. 8 is a cross sectional view illustrating the projection see-through device 70 of Example 2. The prism 10 in the projection see-through device 70 includes the first surface S11 having a weak negative refractive power, the second surface S12 having a relatively strong positive refractive power, the third surface S13 having a relatively weak positive refractive power, the fourth surface S14 having a relatively weak negative refractive power, the fifth surface S15 having a relatively weak positive refractive power, and the sixth surface S16 having a relatively strong positive refractive power. The projection lens 30 includes the first lens 31 having a positive refractive power, the second lens 32 having a negative refractive power, and the third lens 33 having a positive refractive power. A specific specification of the optical system of Example 2 is as follows. That is, a horizontal viewing angle is 20.1°, a vertical viewing angle is 11.4°, the size of a display area of the image display element is 9.22 mm×5.18 mm, a pupil diameter is 5 mm, and a focal distance is about 26 mm.

Figure 9A:
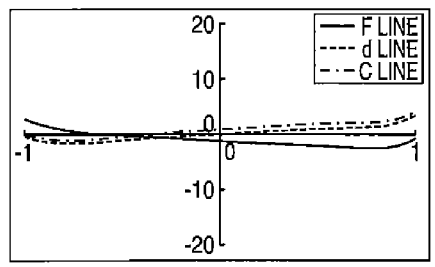
FIGS. 9A to 9F are diagrams illustrating aberrations according to the optical system of Example 2.
Figure 9D:
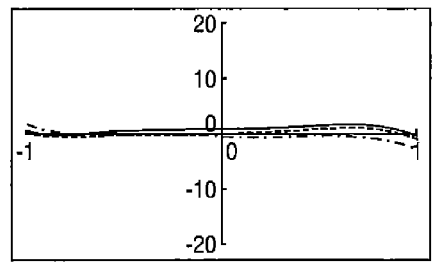
Figure 9B:
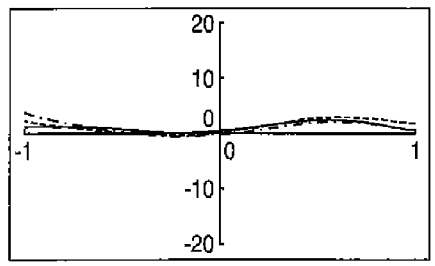
Figure 9E:
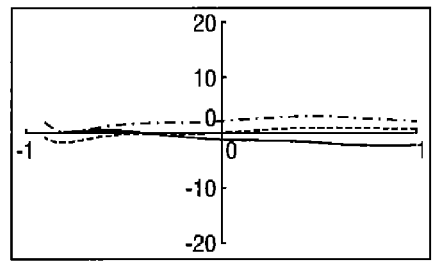
Figure 9C:
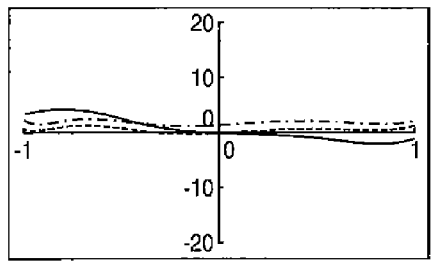
Figure 9F:
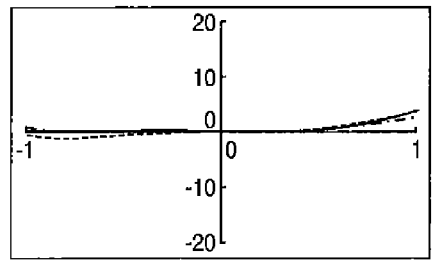
Figure 10A:
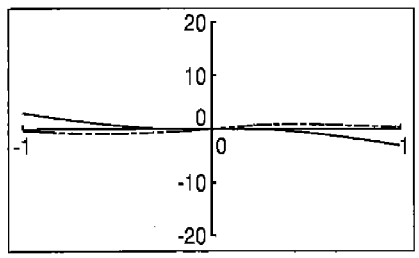
FIGS. 10A to 10F are diagrams illustrating aberrations according to the optical system of Example 2.
Figure 10D:
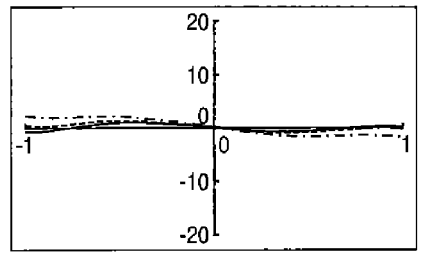
Figure 10B:
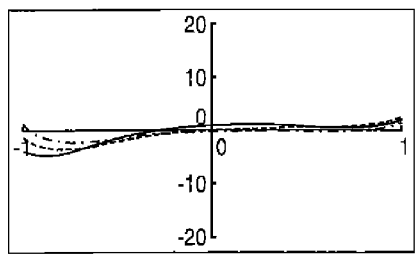
Figure 10E:
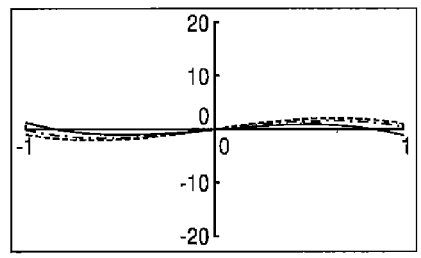
Figure 10C:
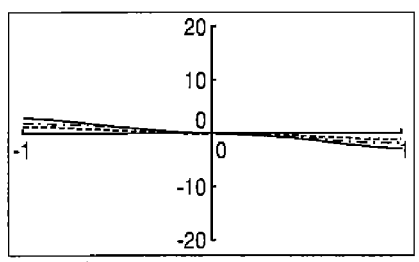
Figure 10F:
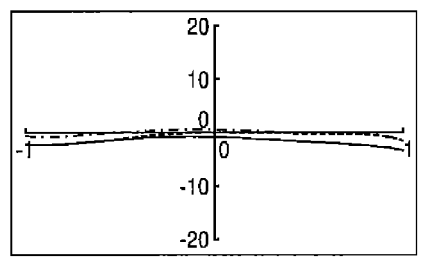

FIGS. 9A to 9F and FIGS. 10A to 10F show aberrations of Example 2. Specifically, FIGS. 9A and 9B show aberrations in the Y and X directions at an azimuth of 10° in the X direction and 5.7° in the Y direction, FIGS. 9C and 9D show aberrations in the Y and X directions at an azimuth of 0.0° in the X direction and 5.7° in the Y direction, and FIGS. 9E and 9F show aberrations in the Y and X directions at an azimuth of −10° in the X direction and 5.7° in the Y direction. FIGS. 10A and 10B show aberrations in the Y and X directions at an azimuth of 10° in the X direction and 0.0° in the Y direction, FIGS. 10C and 10D show aberrations in the Y and X directions at an azimuth of 0.0° in the X direction and 0.0° in the Y direction, and FIGS. 10E and 10F show aberrations in the Y and X directions at an azimuth of −10° in the X direction and 0.0° in the Y direction.

Example 3

In a projection see-through device of Example 3, data on an optical surface that forms a prism and a projection lens is shown in Table 9.

TABLE 9

| No | Type | R | T | Nd | Vd |
|---|---|---|---|---|---|
| 1 | SPH | ∞ | 20.00 | | |
| 2 | FFS1 | −82.379 | 5.50 | 1.525 | 55.95 |
| 3 | FFS2 | −44.857 | −5.50 | 1.525 | 55.95 |
| 4 | FFS1 | −82.379 | 10.00 | 1.525 | 55.95 |
| 5 | FFS3 | −90.616 | −20.00 | 1.525 | 55.95 |
| 6 | FFS4 | 67.062 | 10.00 | 1.525 | 55.95 |
| 7 | FFS5 | 69.676 | −10.00 | 1.525 | 55.95 |
| 8 | FFS4 | 67.062 | −0.50 | | |
| 9 | ASP1 | −6.137 | −6.00 | 1.525 | 55.95 |
| 10 | ASP2 | 6.711 | −0.50 | | |
| 11 | ASP3 | 6.613 | −1.20 | 1.585 | 29.90 |
| 12 | ASP4 | −17.825 | −6.00 | | |
| 13 | ASP5 | −7.024 | −6.00 | 1.525 | 55.95 |
| 14 | ASP6 | 32.129 | −3.91 | | |
| 15 | SPH | ∞ | −1.60 | 1.458 | 67.82 |
| 16 | image surface | | | | |

With respect to the optical surface in the prism that forms Example 3, the optical axis inclination angle (tilt) TLY on the cross section and the optical axis deviation (decenter) DCX are shown in Table 10.

TABLE 10

| No | Type | TLY (before surface) | DCX (after surface) | TLY (after surface) |
|---|---|---|---|---|
| 2 | FFS1 | 0 | 0 | 0 |
| 3 | FFS2 | −28 | 0 | 28 |
| 4 | FFS1 | 0 | 0 | 0 |
| 5 | FFS3 | 0 | 23.17 | −44.19 |
| 6 | FFS4 | 53 | 0 | 53 |
| 7 | FFS5 | −35 | 0 | −35 |
| 8 | FFS4 | 0 | 10 | −17.78 |

With respect to each optical surface in the prism that forms Example 3, a coefficient in a polynomial expansion of a free-form surface is shown in Table 11. In Table 11, signs m and n represent variables or degrees in the coefficient $AK_{m,n}$. Further, the sign FFSk (k=1 to 5) represents a k-th surface among the first to fifth surfaces S11 to S15 that are free-form surfaces.

TABLE 11

| m | n | FFS1 | FFS2 | FFS3 | FFS4 | FFS5 |
|---|---|---|---|---|---|---|
| 2 | 0 | −6.070E−03 | −1.115E−02 | −5.518E−03 | 7.456E−03 | 7.176E−03 |
| 0 | 2 | −6.428E−03 | −1.033E−02 | −5.843E−03 | −1.928E−02 | −1.403E−02 |
| 3 | 0 | 0.000E+00 | 1.034E−04 | 0.000E+00 | 2.404E−04 | 1.204E−03 |
| 1 | 2 | −2.437E−04 | −8.469E−05 | −2.014E−04 | 7.842E−04 | 2.030E−04 |
| 4 | 0 | 8.234E−07 | −3.110E−06 | 6.185E−07 | 1.602E−05 | 1.512E−04 |
| 2 | 2 | −1.084E−05 | 7.972E−06 | −8.142E−06 | 9.630E−05 | 2.067E−05 |
| 0 | 4 | 3.564E−05 | 1.023E−05 | 2.678E−05 | −1.340E−04 | −2.956E−05 |
| 5 | 0 | 5.154E−08 | −3.707E−08 | 3.520E−08 | −5.360E−07 | 1.381E−05 |
| 3 | 2 | 1.671E−06 | −1.035E−07 | 1.141E−06 | −3.882E−06 | 2.044E−05 |
| 1 | 4 | 0.000E+00 | −5.741E−07 | 0.000E+00 | 4.412E−05 | 4.589E−06 |
| 6 | 0 | −7.659E−10 | 2.404E−08 | −4.755E−10 | −6.913E−09 | −1.274E−06 |
| 4 | 2 | −3.089E−08 | −3.373E−09 | −1.918E−08 | −6.764E−07 | −5.177E−07 |
| 2 | 4 | 4.831E−08 | 7.923E−08 | 3.000E−08 | −8.697E−06 | −1.726E−06 |
| 0 | 6 | −5.048E−07 | −1.852E−07 | −3.134E−07 | 5.804E−05 | 3.361E−06 |

Coefficients of an aspheric surface of the optical surface that forms the projection lens in the projection see-through device of Example 3 are shown in Table 12.

TABLE 12

|    | ASP1      | ASP2       | ASP3       | ASP4       | ASP5       | ASP6        |
|----|-----------|------------|------------|------------|------------|-------------|
| K  | 0         | 0          | 0          | 0          | 0          | 0           |
| B4 | 1.969E−04 | −2.830E−03 | −2.165E−03 | 4.007E−04  | 7.860E−04  | −7.467E−05  |
| B6 | 5.824E−06 | 1.443E−04  | 7.601E−05  | −1.350E−04 | −1.371E−05 | 9.941E−07   |
| B8 | 3.833E−07 | −4.093E−06 | −4.139E−06 | 7.564E−07  | 2.842E−07  | −2.326E−07  |

In Table 12, references K and Bi represent coefficients for specifying aspheric surfaces of aspheric surfaces APS1 to APS6 that are lens surfaces of three lenses 31, 32 and 33 that form the projection lens 30.

FIG. 11 is a cross-sectional view illustrating the projection see-through device 70 of Example 3. The prism 10 in the projection see-through device 70 includes the first surface S11 having a weak negative refractive power, the second surface S12 having a relatively strong positive refractive power, the third surface S13 having a relatively weak positive refractive power, the fourth surface S14 having a relatively strong positive refractive power, and the fifth surface S15 having a relatively weak negative refractive power. Here, the fourth surface S14 functions as a reflective surface and a refractive surface, and functions differently from Example 1 and the like. Specifically, the fourth surface S14 functions as a total reflective surface with respect to the light flux (actually, light from the fifth surface S15) that reverses from the third surface S13, and functions as a transmission surface with respect to the light flux (actually, light from the projection lens 30) that reverses from the fifth surface S15. That is, the fourth surface S14 has the same function as that of the fourth surface S14 according to Example 1 with respect to bending of the optical path, and also includes the function of the sixth surface S16 according to Example 1 with respect to convergence of the light flux. The projection lens 30 includes the first lens 31 having a positive refractive power, the second lens 32 having a negative refractive power, and the third lens 33 having a positive refractive power. A specific specification of the optical system of Example 3 is as follows. That is, a horizontal viewing angle is 20.1°, a vertical viewing angle is 11.4°, the size of a display area of the image display element is 9.22 mm×5.18 mm, a pupil diameter is 5 mm, and a focal distance is about 26 mm.

Figure 12A:
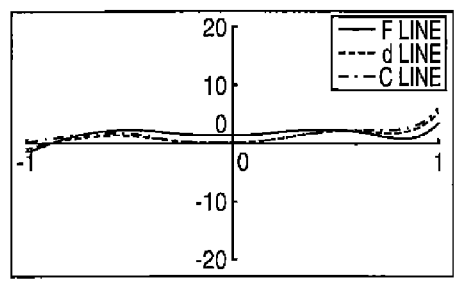
FIGS. 12A to 12F are diagrams illustrating aberrations of the optical system according to Example 3.
Figure 12B:
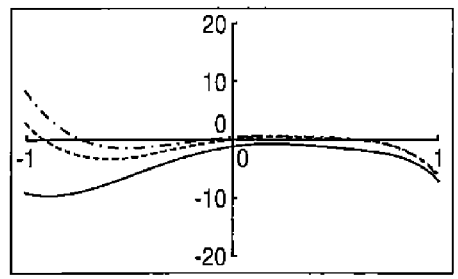
Figure 12C:
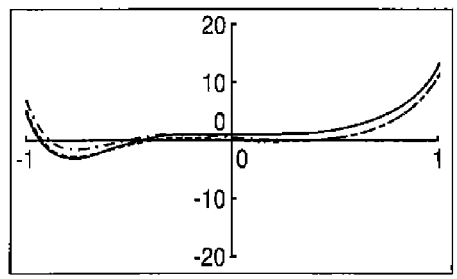
Figure 12D:
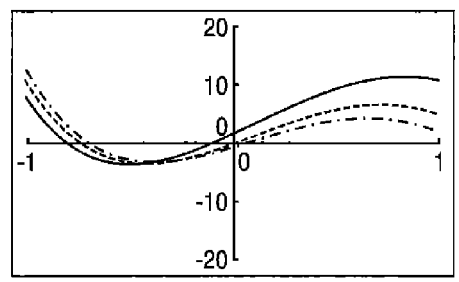
Figure 12E:
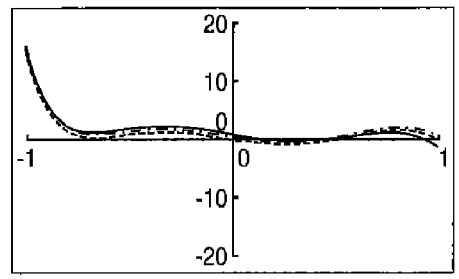
Figure 12F:
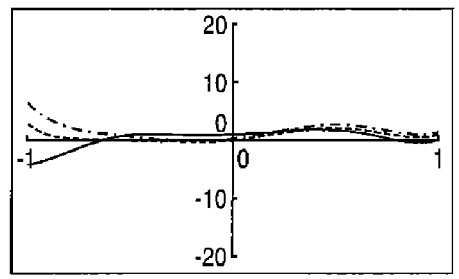
Figure 13A:
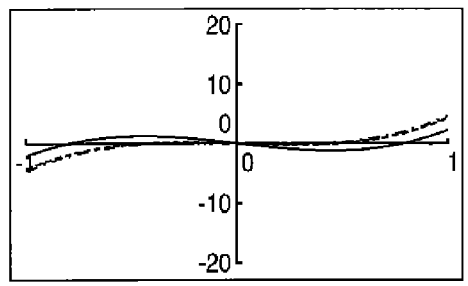
FIGS. 13A to 13F are diagrams illustrating aberrations of the optical system according to Example 3.
Figure 13D:
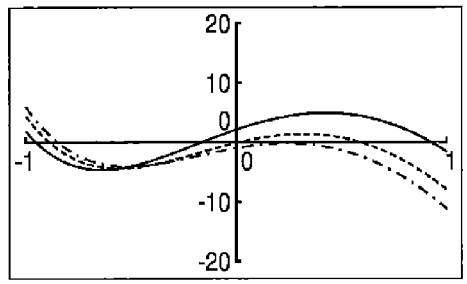
Figure 13B:
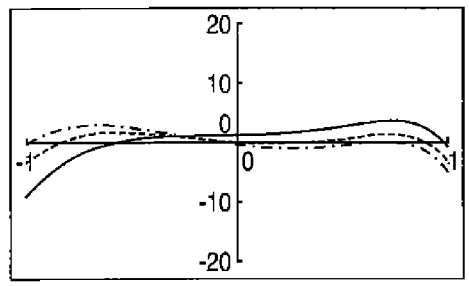
Figure 13E:
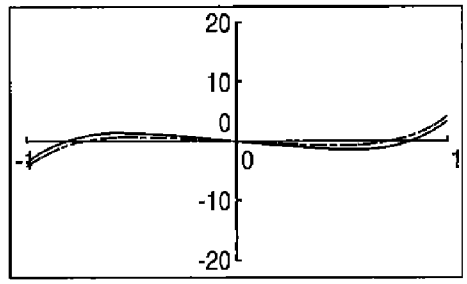
Figure 13C:
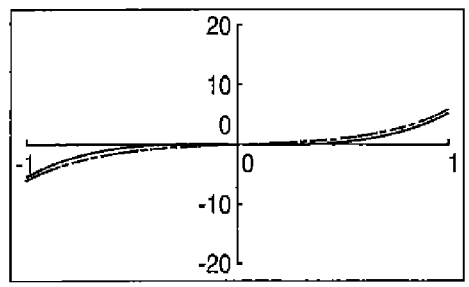
Figure 13F:
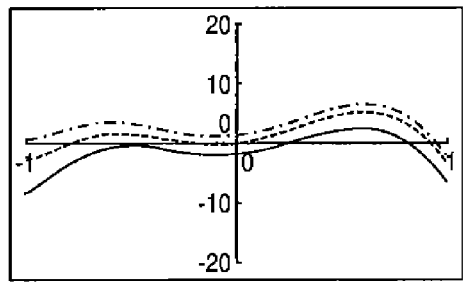

FIGS. 12A to 12F and FIGS. 13A to 13F show aberrations of Example 3. Specifically, FIGS. 12A and 12B show aberrations in the Y and X directions at an azimuth of 10° in the X direction and 5.7° in the Y direction, FIGS. 12C and 12D show aberrations in the Y and X directions at an azimuth of 0.0° in the X direction and 5.7° in the Y direction, and FIGS. 12E and 12F show aberrations in the Y and X directions at an azimuth of −10° in the X direction and 5.7° in the Y direction. FIGS. 13A and 13B show aberrations in the Y and X directions at an azimuth of 10° in the X direction and 0.0° in the Y direction, FIGS. 13C and 13D show aberrations in the Y and X directions at an azimuth of 0.0° in the X direction and 0.0° in the Y direction, and FIGS. 13E and 13F show aberrations in the Y and X directions at an azimuth of −10° in the X direction and 0.0° in the Y direction.

Example 4

In a projection see-through device of Example 4, data on an optical surface that forms a prism and a projection lens is shown in Table 13.

TABLE 13

| No | Type          | R       | T      | Nd    | Vd    |
|----|---------------|---------|--------|-------|-------|
| 1  | SPH           | ∞       | 22.00  |       |       |
| 2  | FFS1          | −55.837 | 5.50   | 1.525 | 55.95 |
| 3  | FFS2          | −37.612 | −5.50  | 1.525 | 55.95 |
| 4  | FFS1          | −55.837 | 10.00  | 1.525 | 55.95 |
| 5  | FFS3          | −65.837 | −20.00 | 1.525 | 55.95 |
| 6  | FFS4          | −56.378 | 14.00  | 1.525 | 55.95 |
| 7  | FFS5          | −63.568 | −10.00 | 1.525 | 55.95 |
| 8  | FFS6          | 6.101   | −2.00  |       |       |
| 9  | ASP1          | 11.090  | −1.04  | 1.585 | 29.90 |
| 10 | ASP2          | −79.528 | −16.94 |       |       |
| 11 | ASP3          | −9.815  | −5.86  | 1.525 | 55.95 |
| 12 | ASP4          | −18.893 | −4.33  |       |       |
| 13 | SPH           | ∞       | −1.60  | 1.458 | 67.82 |
| 14 | image surface |         |        |       |       |

With respect to the optical surface in the prism that forms Example 4, the optical axis inclination angle (tilt) TLY on the cross section and the optical axis deviation (decenter) DCX are shown in Table 14.

TABLE 14

| No | Type | TLY (before surface) | DCX (after surface) | TLY (after surface) |
|----|------|----------------------|---------------------|---------------------|
| 2  | FFS1 | 0                    | 0                   | 0                   |
| 3  | FFS2 | −29                  | 0                   | 29                  |
| 4  | FFS1 | 0                    | 0                   | 0                   |
| 5  | FFS3 | 0                    | 26.085              | −25.91              |
| 6  | FFS4 | 50                   | 0                   | 50                  |
| 7  | FFS5 | −40                  | 0                   | −40                 |
| 8  | FFS6 | 0                    | 0                   | 0                   |

With respect to each optical surface in the prism that forms Example 4, a coefficient in a polynomial expansion of a free-form surface is shown in Table 15. In Table 15, signs m and n represent variables or degrees in the coefficient $AK_{m,n}$. Further, the sign FFSk (k=1 to 6) represents a k-th surface among the first to sixth surfaces S11 to S16 that are free-form surfaces.

TABLE 15

| m | n | FFS1 | FFS2 | FFS3 | FFS4 | FFS5 | FFS6 |
|---|---|------|------|------|------|------|------|
| 2 | 0 | −8.955E−03 | −1.329E−02 | −7.595E−03 | −8.869E−03 | −7.866E−03 | 8.195E−02 |
| 0 | 2 | −1.201E−02 | −1.204E−02 | −1.065E−02 | −5.081E−02 | −2.043E−02 | 8.652E−02 |
| 3 | 0 | 1.823E−04 | 6.369E−05 | 1.823E−04 | −1.761E−04 | 3.264E−05 | −5.225E−04 |
| 1 | 2 | −5.163E−04 | −1.991E−04 | −5.163E−04 | −1.299E−04 | −6.377E−05 | −7.905E−04 |
| 4 | 0 | −3.361E−06 | −3.444E−06 | −3.361E−06 | −5.825E−06 | 2.535E−05 | −1.555E−03 |
| 2 | 2 | 5.620E−05 | 1.336E−05 | 5.620E−05 | −1.857E−04 | 2.628E−05 | −3.445E−03 |
| 0 | 4 | 5.166E−05 | 1.022E−05 | 5.166E−05 | −7.313E−05 | 3.906E−05 | −1.730E−03 |
| 5 | 0 | −2.374E−07 | 5.771E−07 | −2.374E−07 | −6.804E−07 | −1.521E−06 | −6.119E−06 |
| 3 | 2 | −4.394E−06 | −5.833E−07 | −4.394E−06 | −3.900E−05 | −8.096E−06 | −4.404E−05 |
| 1 | 4 | −2.834E−06 | −1.072E−06 | −2.834E−06 | −2.896E−05 | −3.280E−06 | −1.687E−05 |
| 6 | 0 | 3.994E−09 | −4.895E−08 | 3.994E−09 | −5.257E−06 | −4.371E−07 | −5.490E−06 |
| 4 | 2 | 2.427E−08 | 7.308E−08 | 2.427E−08 | −5.677E−06 | −2.836E−06 | −2.111E−05 |
| 2 | 4 | −2.090E−07 | 1.421E−07 | −2.090E−07 | −2.466E−05 | −4.211E−06 | −1.439E−05 |
| 0 | 6 | −3.139E−06 | −3.483E−07 | −3.139E−06 | 1.050E−05 | −1.811E−06 | −1.499E−06 |

Coefficients of an aspheric surface of the optical surface that forms the projection lens in the projection see-through device of Example 4 are shown in Table 16.

TABLE 16

|    | ASP1 | ASP2 | ASP3 | ASP4 |
|----|------|------|------|------|
| K  | 0 | 0 | 0 | 0 |
| B4 | −5.177E−04 | 1.435E−03 | 3.151E−04 | 4.598E−04 |
| B6 | −1.900E−04 | −2.227E−04 | 9.531E−07 | 1.107E−05 |
| B8 | 1.172E−05 | 1.240E−05 | 1.639E−07 | −7.800E−08 |

In Table 16, references K and Bi represent coefficients for specifying aspheric surfaces of aspheric surfaces APS1 to APS4 that are lens surfaces of two lenses 31 and 32 that form the projection lens 30.

FIG. 14 is a cross-sectional view illustrating a projection see-through device 70 of Example 4. The prism 10 in the projection see-through device 70 includes the first surface S11 having a weak negative refractive power, the second surface S12 having a relatively strong positive refractive power, the third surface S13 having a relatively weak positive refractive power, the fourth surface S14 having a relatively weak negative refractive power, the fifth surface S15 having a relatively weak positive refractive power, and the sixth surface S16 having a relatively strong positive refractive power. That is, the prism 10 according to Example 4 includes the same surfaces of the first to sixth surfaces S11 to S16 as those of Example 1. The projection lens 30 includes the first lens 31 having a negative refractive power and the second lens 32 having a positive refractive power. A specific specification of the optical system of Example 4 is as follows. That is, a horizontal viewing angle is 20.1°, a vertical viewing angle is 11.4°, the size of a display area of the image display element is 9.22 mm×5.18 mm, a pupil diameter is 5 mm, and a focal distance is about 26 mm.

Figure 15A:
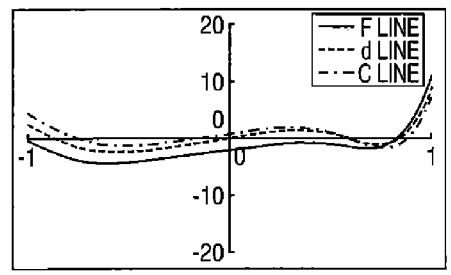
FIGS. 15A to 15F are diagrams illustrating aberrations of the optical system according to Example 4.
Figure 15B:
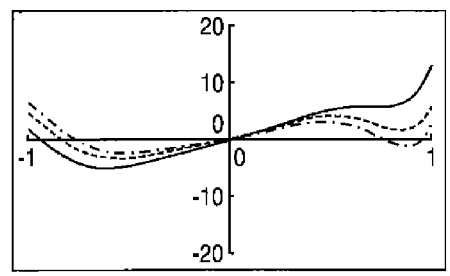
Figure 15C:
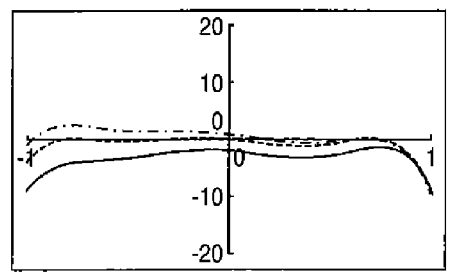
Figure 15D:
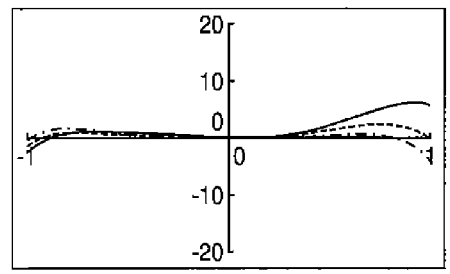
Figure 15E:
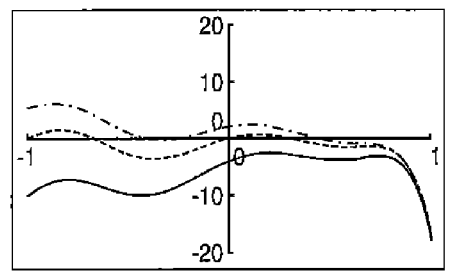
Figure 15F:
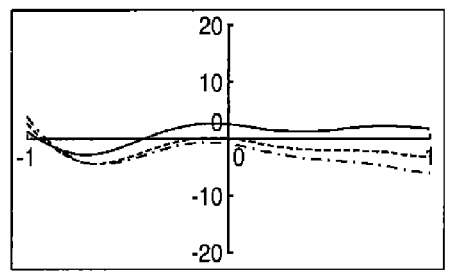
Figure 16A:
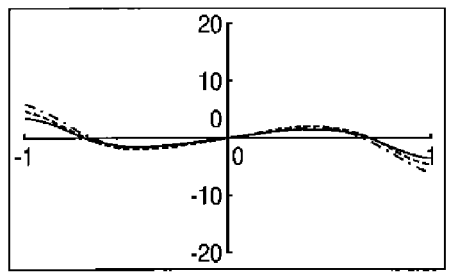
FIGS. 16A to 16F are diagrams illustrating aberrations of the optical system according to Example 4.
Figure 16D:
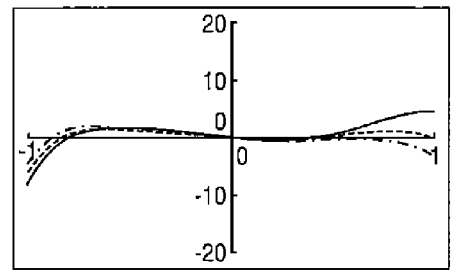
Figure 16B:
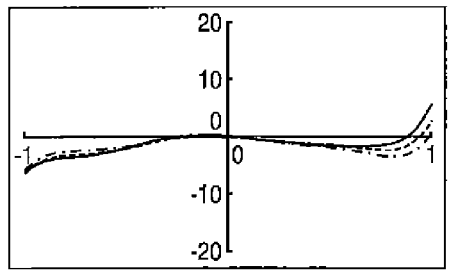
Figure 16E:
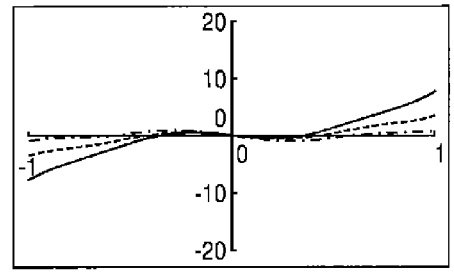
Figure 16C:
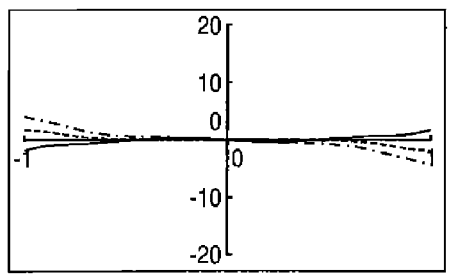
Figure 16F:
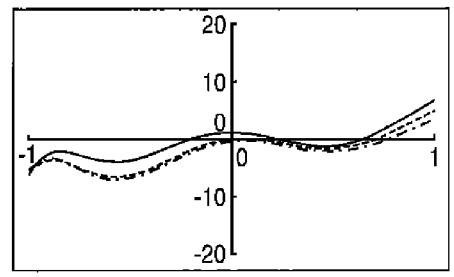

FIGS. 15A to 15F and FIGS. 16A to 16F show aberrations of Example 4. Specifically, FIGS. 15A and 15B show aberrations in the Y and X directions at an azimuth of 10° in the X direction and 5.7° in the Y direction, FIGS. 15C and 15D show aberrations in the Y and X directions at an azimuth of 0.0° in the X direction and 5.7° in the Y direction, and FIGS. 15E and 15F show aberrations in the Y and X directions at an azimuth of −10° in the X direction and 5.7° in the Y direction. FIGS. 16A and 16B show aberrations in the Y and X directions at an azimuth of 10° in the X direction and 0.0° in the Y direction, FIGS. 16C and 16D show aberrations in the Y and X directions at an azimuth of 0.0° in the X direction and 0.0° in the Y direction, and FIGS. 16E and 16F show aberrations in the Y and X directions at an azimuth of −10° in the X direction and 0.0° in the Y direction.

Example 5

In a projection see-through device of Example 5, data on an optical surface that forms a prism and a projection lens is shown in Table 17.

TABLE 17

| No | Type | R | T | Nd | Vd |
|----|------|---|---|----|----|
| 1 | SPH | ∞ | 22.00 | | |
| 2 | FFS1 | −39.118 | 5.50 | 1.525 | 55.95 |
| 3 | FFS2 | −31.449 | −5.50 | 1.525 | 55.95 |
| 4 | FFS1 | −39.118 | 9.00 | 1.525 | 55.95 |
| 5 | FFS3 | −48.118 | −17.00 | 1.525 | 55.95 |
| 6 | FFS4 | −199.332 | 7.00 | 1.525 | 55.95 |
| 7 | FFS5 | −12.166 | 2.00 | 1.525 | 55.95 |
| 8 | ASP1 | 8.785 | 4.00 | 1.525 | 55.95 |
| 9 | ASP2 | −5.133 | 0.50 | | |
| 10 | ASP3 | −4.931 | 1.50 | 1.585 | 29.90 |
| 11 | ASP4 | 37.413 | 7.73 | | |
| 12 | ASP5 | 7.796 | 6.00 | 1.525 | 55.95 |
| 13 | ASP6 | 49.915 | 8.98 | | |
| 14 | SPH | ∞ | 1.60 | 1.458 | 67.82 |
| 15 | image surface | | | | |

With respect to the optical surface in the prism that forms Example 5, the optical axis inclination angle (tilt) TLY on the cross section and the optical axis deviation (decenter) DCX are shown in Table 18.

TABLE 18

| No | Type | TLY (before surface) | DCX (after surface) | TLY (after surface) |
|----|------|---------------------|---------------------|---------------------|
| 2 | FFS1 | 0 | 0 | 0 |
| 3 | FFS2 | −26 | 0 | 26 |
| 4 | FFS1 | 0 | 0 | 0 |
| 5 | FFS3 | 0 | 20.598 | −17.829 |
| 6 | FFS4 | 55 | 0 | 55 |
| 7 | FFS5 | 0 | 0 | 0 |

With respect to each optical surface in the prism that forms Example 5, a coefficient in a polynomial expansion of a free-form surface is shown in Table 19. In Table 19, signs m and n represent variables or degrees in the coefficient $AK_{m,n}$. Further, the sign FFSk (k=1 to 5) represents a k-th surface among the first to fifth surfaces S11 to S15 that are free-form surfaces.

TABLE 19

| m | n | FFS1 | FFS2 | FFS3 | FFS4 | FFS5 |
|---|---|---|---|---|---|---|
| 2 | 0 | −1.278E−02 | −1.590E−02 | −1.039E−02 | −2.508E−03 | −4.110E−02 |
| 0 | 2 | −1.031E−02 | −1.465E−02 | −7.915E−03 | 2.846E−04 | −4.590E−02 |
| 3 | 0 | 5.470E−04 | 6.295E−05 | 5.470E−04 | −5.271E−04 | −2.251E−03 |
| 1 | 2 | 1.214E−04 | −8.558E−06 | 1.214E−04 | 4.327E−04 | 1.820E−03 |
| 4 | 0 | −2.849E−05 | −7.384E−06 | −2.849E−05 | −2.327E−05 | −5.909E−04 |
| 2 | 2 | −2.298E−05 | 2.242E−07 | −2.298E−05 | −3.912E−05 | −4.964E−04 |
| 0 | 4 | 2.581E−05 | 7.233E−06 | 2.581E−05 | 6.756E−06 | −2.117E−04 |
| 5 | 0 | 4.204E−08 | 5.252E−07 | 4.204E−08 | −5.136E−06 | −8.760E−05 |
| 3 | 2 | −2.838E−06 | 5.864E−07 | −2.838E−06 | −1.120E−05 | −7.639E−05 |
| 1 | 4 | −6.797E−07 | 3.094E−07 | −6.797E−07 | −6.235E−06 | 3.387E−06 |
| 6 | 0 | 1.565E−08 | −3.282E−08 | 1.565E−08 | −8.153E−07 | −5.669E−06 |
| 4 | 2 | 2.394E−07 | −5.737E−08 | 2.394E−07 | −1.000E−06 | 2.543E−05 |
| 2 | 4 | −6.689E−07 | −4.700E−08 | −6.689E−07 | 8.903E−07 | 1.871E−05 |
| 0 | 6 | 1.161E−06 | 1.909E−07 | 1.161E−06 | 2.170E−06 | 8.139E−06 |

Coefficients of an aspheric surface of the optical surface that forms the projection lens in the projection see-through device of Example 5 are shown in Table 20.

TABLE 20

|  | ASP1 | ASP2 | ASP3 | ASP4 | ASP5 | ASP6 |
|---|---|---|---|---|---|---|
| K | 0 | 0 | 0 | 0 | 0 | 0 |
| B4 | −3.374E−04 | 4.246E−03 | 3.865E−03 | −1.200E−03 | −6.648E−04 | 2.622E−05 |
| B6 | 7.302E−06 | −2.480E−04 | −2.282E−04 | 6.286E−05 | 3.223E−06 | −3.549E−06 |
| B8 | −2.376E−06 | 7.048E−06 | 1.019E−05 | −6.793E−07 | −9.008E−08 | 7.365E−08 |

In Table 20, references K and Bi represent coefficients for specifying aspheric surfaces of aspheric surfaces APS1 to APS6 that are lens surfaces of three lenses 31, 32 and 33 that form the projection lens 30.

Figure 17:
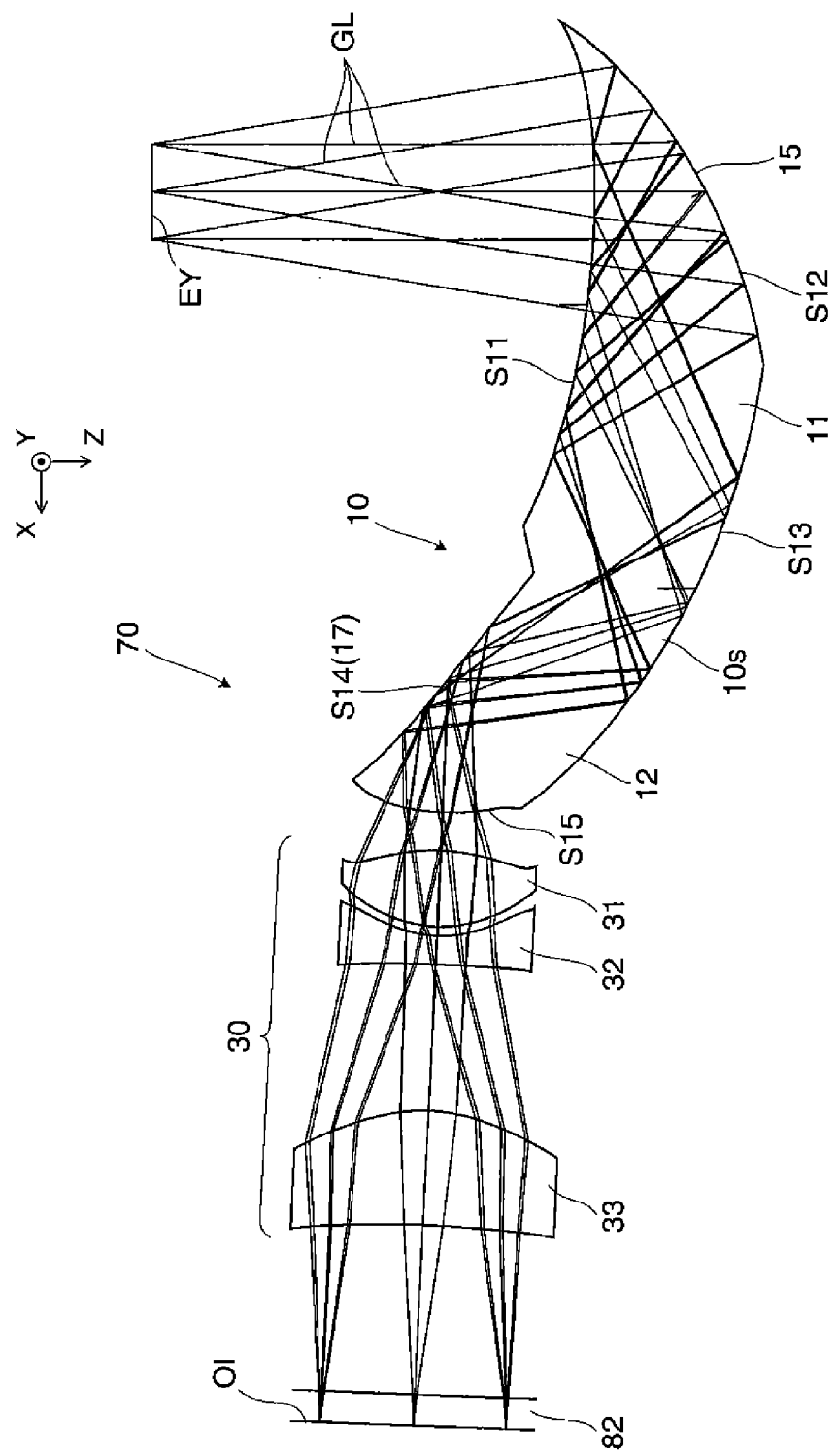
FIG. 17 is a diagram illustrating an optical system according to Example 5.

FIG. 17 is a cross-sectional view illustrating a projection see-through device 70 of Example 5. The prism 10 in the projection see-through device 70 includes the first surface S11 having a weak negative refractive power, the second surface S12 having a relatively strong positive refractive power, the third surface S13 having a relatively weak positive refractive power, the fourth surface S14 having a relatively weak negative refractive power, and the fifth surface S15 having a relatively strong positive refractive power. Here, the fifth surface S15 has the function of the sixth surface S16 according to Example 1 with respect to convergence of the light flux. That is, Example 5 in FIG. 17 may be considered as a case where the fifth surface S15 is omitted from the first to sixth surfaces S11 to S16 according to Example 1 shown in FIG. 5. The projection lens 30 includes the first lens 31 having a positive refractive power, the second lens 32 having a negative refractive power, and the third lens 33 having a positive refractive power. A specific specification of the optical system of Example 5 is as follows. That is, a horizontal viewing angle is 20.1°, a vertical viewing angle is 11.4°, the size of a display area of the image display element is 9.22 mm×5.18 mm, a pupil diameter is 5 mm, and a focal distance is about 26 mm.

Figure 18A:
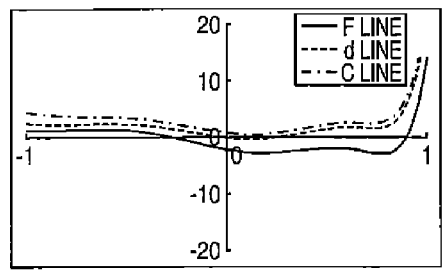
FIGS. 18A to 18F are diagrams illustrating aberrations of the optical system according to Example 5.
Figure 18D:
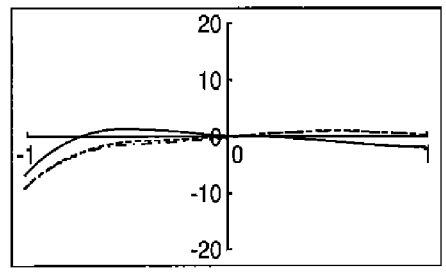
Figure 18B:
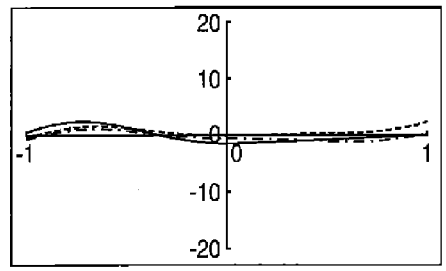
Figure 18E:
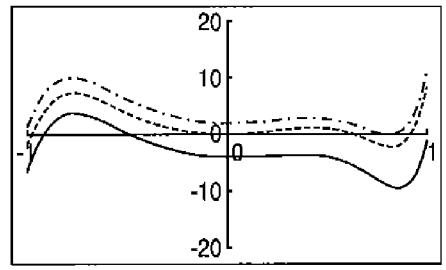
Figure 18C:
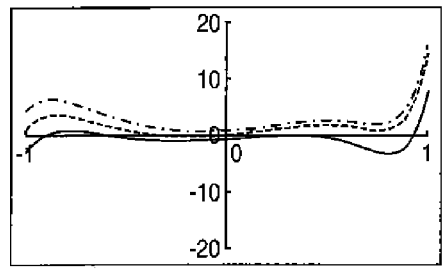
Figure 18F:
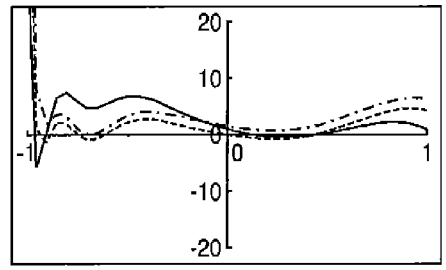
Figure 19A:
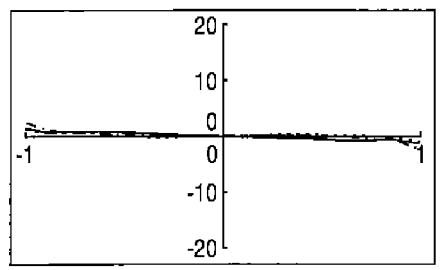
FIGS. 19A to 19F are diagrams illustrating aberrations of the optical system according to Example 5.
Figure 19D:
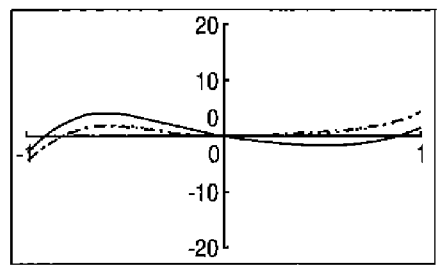
Figure 19B:
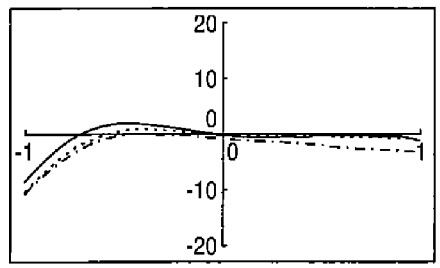
Figure 19E:
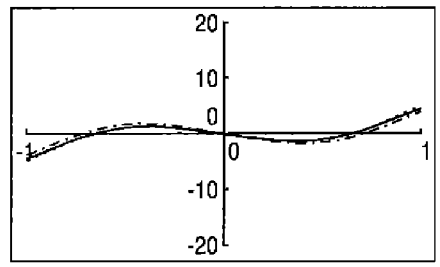
Figure 19C:
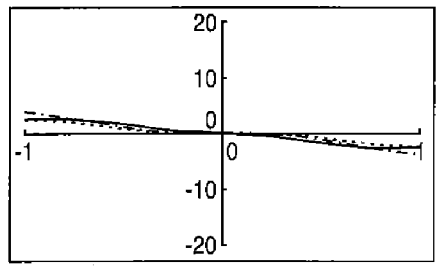
Figure 19F:
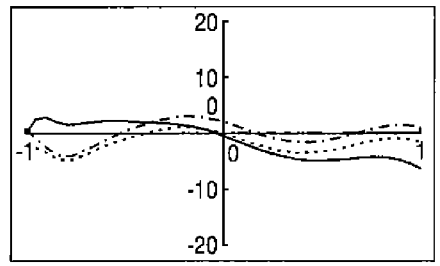

FIGS. 18A to 18F and FIGS. 19A to 19F show aberrations of Example 5. Specifically, FIGS. 18A and 18B show aberrations in the Y and X directions at an azimuth of 10° in the X direction and 5.7° in the Y direction, FIGS. 18C and 18D show aberrations in the Y and X directions at an azimuth of 0.0° in the X direction and 5.7° in the Y direction, and FIGS. 18E and 18F show aberrations in the Y and X directions at an azimuth of −10° in the X direction and 5.7° in the Y direction. FIGS. 19A and 19B show aberrations in the Y and X directions at an azimuth of 10° in the X direction and 0.0° in the Y direction, FIGS. 19C and 19D show aberrations in the Y and X directions at an azimuth of 0.0° in the X direction and 0.0° in the Y direction, and FIGS. 19E and 19F show aberrations in the Y and X directions at an azimuth of −10° in the X direction and 0.0° in the Y direction.

Example 6

In a projection see-through device of Example 6, data on an optical surface that forms a prism and a projection lens is shown in Table 21.

TABLE 21

| No | Type | R | T | Nd | Vd |
|---|---|---|---|---|---|
| 1 | SPH | ∞ | 22.00 |  |  |
| 2 | FFS1 | −105.883 | 5.50 | 1.525 | 55.95 |
| 3 | FFS2 | −51.559 | −5.50 | 1.525 | 55.95 |
| 4 | FFS1 | −105.883 | 10.00 | 1.525 | 55.95 |
| 5 | FFS3 | −115.883 | −16.00 | 1.525 | 55.95 |
| 6 | FFS4 | 47.813 | −2.00 | 1.525 | 55.95 |
| 7 | ASP1 | −12.173 | −6.00 | 1.525 | 55.95 |
| 8 | ASP2 | 7.135 | −2.37 |  |  |
| 9 | ASP3 | 9.518 | −1.57 | 1.585 | 29.90 |
| 10 | ASP4 | 10.990 | −6.00 |  |  |
| 11 | ASP5 | −6.644 | −6.00 | 1.525 | 55.95 |
| 12 | ASP6 | 18.408 | −6.00 |  |  |
| 13 | SPH | ∞ | −1.60 | 1.458 | 67.82 |
| 14 | image surface |  |  |  |  |

With respect to the optical surface in the prism that forms Example 6, the optical axis inclination angle (tilt) TLY on the cross section and the optical axis deviation (decenter) DCX are shown in Table 22.

TABLE 22

| No | Type | TLY (before surface) | DCX (after surface) | TLY (after surface) |
|---|---|---|---|---|
| 2 | FFS1 | 0 | 0 | 0 |
| 3 | FFS2 | −29 | 0 | 29 |
| 4 | FFS1 | 0 | 0 | 0 |
| 5 | FFS3 | 0 | 24.385 | −39.86 |
| 6 | FFS4 | 0 | 0 | 0 |

With respect to each optical surface in the prism that forms Example 6, a coefficient in a polynomial expansion of a free-form surface is shown in Table 23. In Table 23, signs m and n represent variables or degrees in the coefficient $AK_{m,n}$. Further, the sign FFSk (k=1 to 4) represents a k-th surface among the first to fourth surfaces S11 to S14 that are free-form surfaces.

TABLE 23

| m | n | FFS1 | FFS2 | FFS3 | FFS4 |
|---|---|---|---|---|---|
| 2 | 0 | −4.722E−03 | −9.698E−03 | −4.315E−03 | 1.046E−02 |
| 0 | 2 | −1.296E−02 | −1.334E−02 | −1.255E−02 | 1.922E−02 |
| 3 | 0 | 6.643E−05 | 2.742E−05 | 6.643E−05 | −2.215E−03 |
| 1 | 2 | −3.370E−04 | 3.311E−05 | −3.370E−04 | −1.947E−03 |
| 4 | 0 | −1.275E−06 | −6.127E−06 | −1.275E−06 | −7.168E−05 |
| 2 | 2 | 5.851E−05 | 1.804E−06 | 5.851E−05 | −2.635E−04 |
| 0 | 4 | −9.220E−05 | −1.825E−05 | −9.220E−05 | −4.297E−05 |
| 5 | 0 | −8.059E−08 | 6.737E−07 | −8.059E−08 | 0.000E+00 |
| 3 | 2 | −3.876E−06 | −1.785E−07 | −3.876E−06 | 0.000E+00 |
| 1 | 4 | 1.201E−05 | 3.227E−06 | 1.201E−05 | 0.000E+00 |
| 6 | 0 | 1.502E−09 | −4.077E−08 | 1.502E−09 | 0.000E+00 |
| 4 | 2 | 4.085E−08 | −1.735E−08 | 4.085E−08 | 0.000E+00 |
| 2 | 4 | −5.448E−07 | −4.874E−07 | −5.448E−07 | 0.000E+00 |
| 0 | 6 | −1.147E−06 | 1.178E−08 | −1.147E−06 | 0.000E+00 |

Coefficients of an aspheric surface of the optical surface that forms the projection lens in the projection see-through device of Example 6 are shown in Table 24.

TABLE 24

| | ASP1 | ASP2 | ASP3 | ASP4 | ASP5 | ASP6 |
|---|---|---|---|---|---|---|
| K | 0 | 0 | 0 | 0 | 0 | 0 |
| B4 | 4.249E−04 | −4.544E−04 | −4.268E−04 | −1.336E−03 | 6.899E−04 | −1.589E−03 |
| B6 | −4.754E−07 | −1.239E−05 | 4.568E−05 | 1.470E−04 | −7.469E−07 | 2.840E−05 |
| B8 | −5.301E−08 | 4.093E−08 | −6.304E−06 | −2.645E−05 | 4.179E−07 | 3.598E−08 |

In Table 24, references K and Bi represent coefficients for specifying aspheric surfaces of aspheric surfaces APS1 to APS6 that are lens surfaces of three lenses 31, 32 and 33 that form the projection lens 30.

Figure 20:
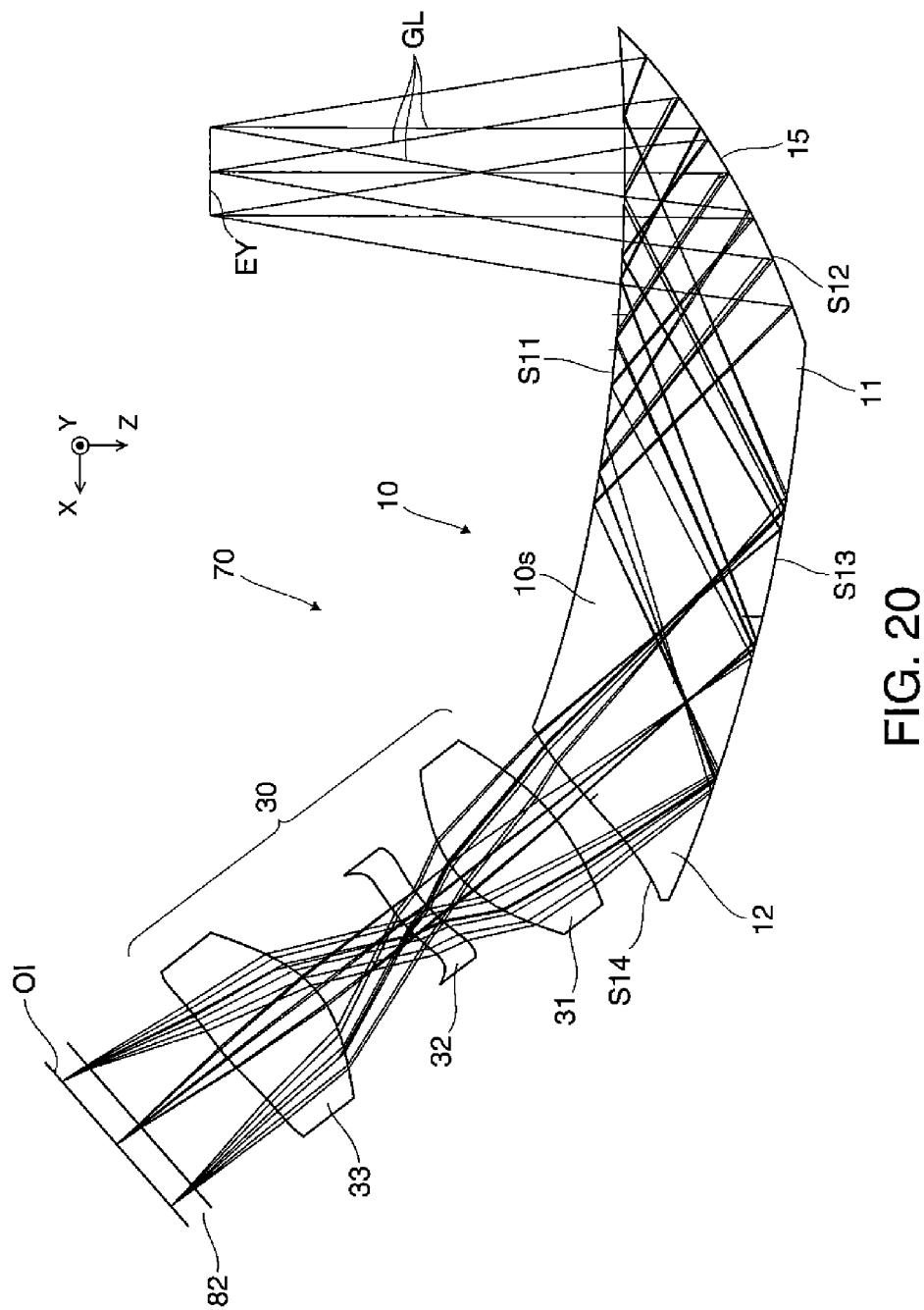
FIG. 20 is a diagram illustrating an optical system according to Example 6.

FIG. 20 is a cross-sectional view illustrating a projection see-through device 70 of Example 6. The prism 10 in the projection see-through device 70 includes the first surface S11 having a weak negative refractive power, the second surface S12 having a relatively strong positive refractive power, the third surface S13 having a relatively weak positive refractive power, and the fourth surface S14 having a relatively strong positive refractive power. Here, the fourth surface S14 has the function of the sixth surface S16 according to Example 1 with respect to convergence of the light flux. That is, Example 6 in FIG. 20 may be considered as a case where the fourth surface S14 and the fifth surface S15 are omitted from the first to sixth surfaces S11 to S16 according to Example 1 shown in FIG. 5. The projection lens 30 includes the first lens 31 having a positive refractive power, the second lens 32 having a negative refractive power, and the third lens 33 having a positive refractive power. A specific specification of the optical system of Example 6 is as follows. That is, a horizontal viewing angle is 20.1°, a vertical viewing angle is 11.4°, the size of a display area of the image display element is 9.22 mm×5.18 mm, a pupil diameter is 5 mm, and a focal distance is about 26 mm.

Figure 21A:
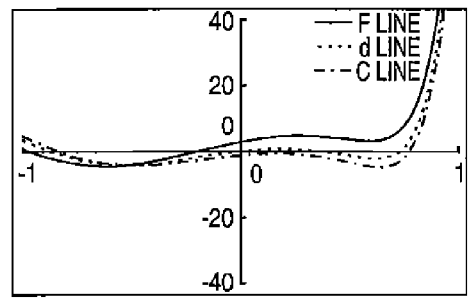
FIGS. 21A to 21F are diagrams illustrating aberrations of the optical system according to Example 6.
Figure 21D:
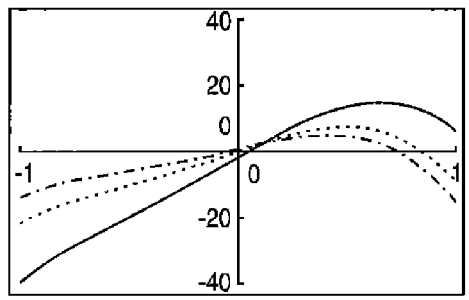
Figure 21B:
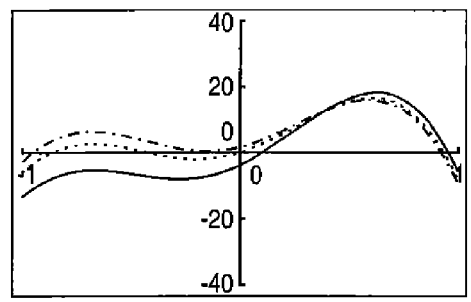
Figure 21E:
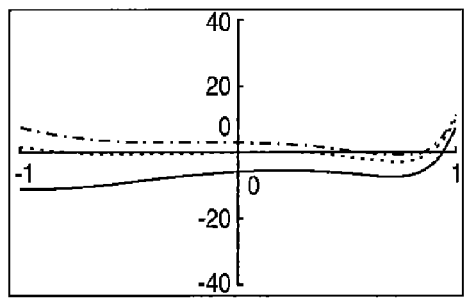
Figure 21C:
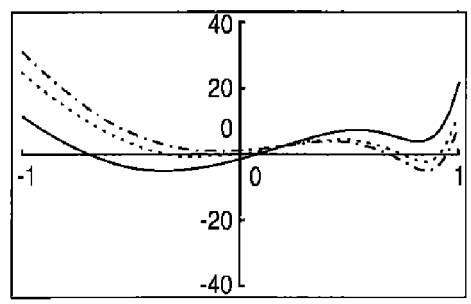
Figure 21F:
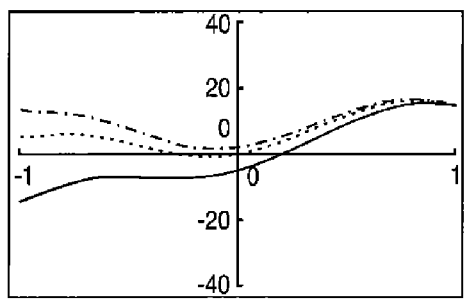
Figure 22A:
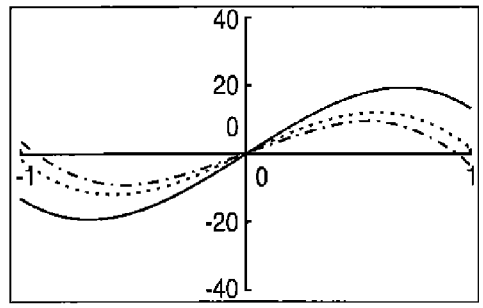
FIGS. 22A to 22F are diagrams illustrating aberrations of the optical system according to Example 6.
Figure 22D:
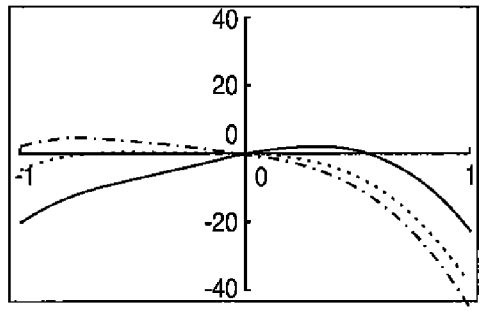
Figure 22B:
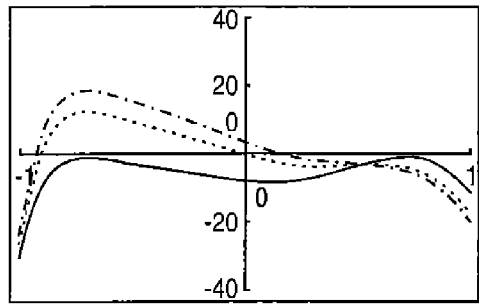
Figure 22E:
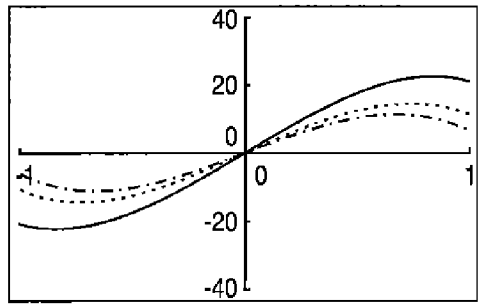
Figure 22C:
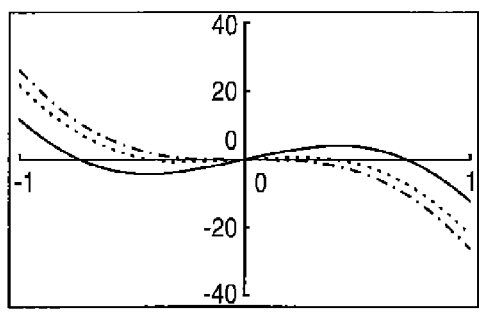
Figure 22F:
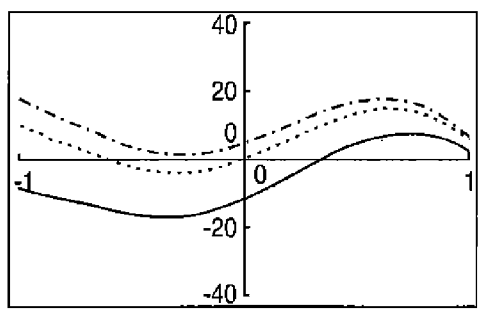

FIGS. 21A to 21F and FIGS. 22A to 22F show aberrations of Example 6. Specifically, FIGS. 21A and 21B show aberrations in the Y and X directions at an azimuth of 10° in the X direction and 5.7° in the Y direction, FIGS. 21C and 21D show aberrations in the Y and X directions at an azimuth of 0.0° in the X direction and 5.7° in the Y direction, and FIGS. 21E and 21F show aberrations in the Y and X directions at an azimuth of −10° in the X direction and 5.7° in the Y direction. FIGS. 22A and 22B show aberrations in the Y and X directions at an azimuth of 10° in the X direction and 0.0° in the Y direction, FIGS. 22C and 22D show aberrations in the Y and X directions at an azimuth of 0.0° in the X direction and 0.0° in the Y direction, and FIGS. 22E and 22F show aberrations in the Y and X directions at an azimuth of −10° in the X direction and 0.0° in the Y direction.

In Table 25, numerical data relating to the conditional expressions (1) to (3) is shown with respect to the respective Examples 1 to 6.

TABLE 25

| | Coefficient value or Conditional value | Example 1 | Example 2 | Example 3 | Example 4 | Example 5 | Example 6 |
|---|---|---|---|---|---|---|---|
| | $A1_{2,0}$ | −6.511E−03 | −4.110E−03 | −6.070E−03 | −8.955E−03 | −1.278E−02 | −4.722E−03 |
| | $A1_{0,2}$ | −8.627E−03 | −6.261E−03 | −6.428E−03 | −1.201E−02 | −1.031E−02 | −1.296E−02 |
| | $A3_{2,0}$ | −5.761E−03 | −3.798E−03 | −5.518E−03 | −7.595E−03 | −1.039E−02 | −4.315E−03 |
| | $A3_{0,2}$ | −7.877E−03 | −5.949E−03 | −5.843E−03 | −1.065E−02 | −7.915E−03 | −1.255E−02 |
| Conditional expression (1) | $A1_{2,0} + A1_{0,2}$ | −1.514E−02 | −1.037E−02 | −1.250E−02 | −2.096E−02 | −2.309E−02 | −1.768E−02 |
| Conditional expression (1) | $A3_{2,0} + A3_{0,2}$ | −1.364E−02 | −9.746E−03 | −1.136E−02 | −1.824E−02 | −1.831E−02 | −1.687E−02 |
| Conditional expression (2) | $A1_{2,0} - A1_{0,2}$ | 2.116E−03 | 2.151E−03 | 3.580E−04 | 3.052E−03 | −2.476E−03 | 8.239E−03 |

TABLE 25-continued

| Coefficient value or Conditional value | | Example 1 | Example 2 | Example 3 | Example 4 | Example 5 | Example 6 |
|---|---|---|---|---|---|---|---|
| Conditional expression (3) | $A1_{2,0} - A3_{2,0}$ | −7.503E−04 | −3.122E−04 | −5.517E−04 | −1.360E−03 | −2.391E−03 | −4.075E−04 |
| Conditional expression (3) | $A1_{0,2} - A3_{0,2}$ | −7.503E−04 | −3.122E−04 | −5.842E−04 | −1.360E−03 | −2.391E−03 | −4.075E−04 |

Further, in Table 26, numerical data relating to the interval between the first surface S11 and the third surface S13 and the inclination angle of the second surface S12 to the first surface S11 is shown with respect to the respective Examples 1 to 6.

TABLE 26

| | Example 1 | Example 2 | Example 3 | Example 4 | Example 5 | Example 6 |
|---|---|---|---|---|---|---|
| Interval between S11 and S13 (mm) | 10.00 | 10.00 | 10.00 | 10.00 | 9.00 | 10.00 |
| Inclination angle of S12 to S11 (°) | 29 | 29 | 28 | 29 | 26 | 29 |

Further, the conditional expression (3) affects diopter of the prism with respect to the external light. Here, when the thickness of the prism is T and the refractive index thereof is N, diopter Dx in the x axis direction and diopter Dy in the y axis direction on the optical axis of the prism are given as follows.

$$Dx = 2000(N-1)(A1_{2,0} - A3_{2,0} + (2T(N-1)/N) \times A1_{2,0} \times A3_{2,0})$$

$$Dy = 2000(N-1)(A1_{0,2} - A3_{0,2} + (2T(N-1)/N) \times A1_{0,2} \times A3_{0,2})$$

Numerical data relating to diopters with respect to the respective Examples 1 to 6 is shown in Table 27 on the basis of the above expression.

TABLE 27

| | Example 1 | Example 2 | Example 3 | Example 4 | Example 5 | Example 6 |
|---|---|---|---|---|---|---|
| Diopter Dx (D: diopter) | −0.52 | −0.21 | −0.34 | −0.94 | −1.65 | −0.28 |
| Diopter Dy (D: diopter) | −0.30 | −0.06 | −0.34 | −0.50 | −1.98 | 0.75 |
| Thickness of prism T (mm) | 10 | 10 | 10 | 10 | 9 | 10 |
| Refractive index N | 1.525 | 1.525 | 1.525 | 1.525 | 1.525 | 1.525 |

Others

The invention has been described on the basis of the respective Examples, but the invention is not limited to the above-mentioned Examples, and may be realized in various forms in a range without departing from the spirit of the invention. For example, the following modification examples may be used.

In the above description, the half mirror layer (semi-transparent reflective film) 15 is formed in the horizontally long rectangular region, but a contour of the half mirror layer 15 may be appropriately changed according to usages. Further, the transmittance or reflectivity of the half mirror layer 15 may be changed according to usages.

In the above description, distribution of display luminance in the image display element 82 is not particularly adjusted, but in a case where a luminance difference occurs according to positions, for example, it is possible to unevenly adjust the distribution of display luminance.

In the above description, the image display element 82 that includes a transmissive liquid crystal display device or the like is used as the image display device 80, but this is not limited. That is, it is possible to use various types of devices as the image display device 80. For example, it is possible to use a configuration using a reflective liquid crystal display device, and to use a digital micro-mirror device or the like instead of the image display element 82 that includes the liquid crystal display or the like. Further, it is possible to use a light emitting element represented by an LED array, an OLED (organic EL) or the like, as the image display device 80.

In the above embodiment, the image display device 80 that includes the transmissive liquid crystal display device or the like is used, but instead, it is possible to use a scanning image display device.

Figure 23:
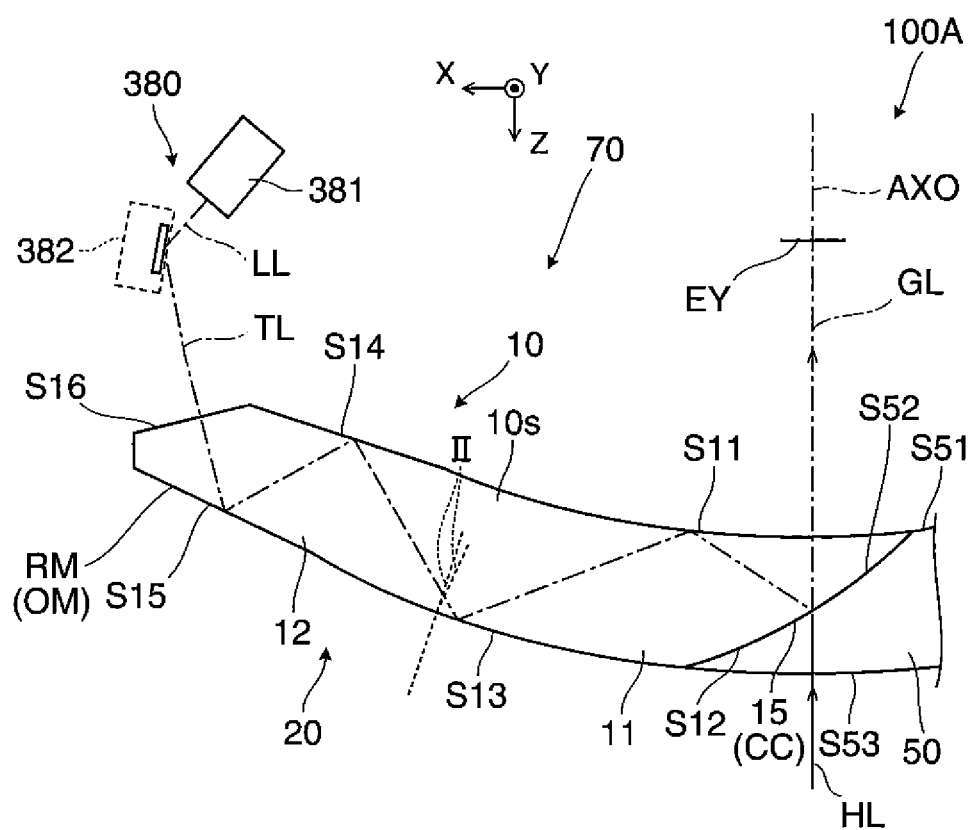
FIG. 23 is a diagram illustrating a virtual image display apparatus according to a modification example.

Specifically, as shown in FIG. 23, the first display device 100A that is the virtual image display apparatus includes a light guiding portion 20 and an image display device 380. Since the light guiding portion 20 corresponds to the first optical portion 103a in FIG. 1 according to the above-described embodiment, that is, corresponds to a portion where the prism 10 and the light transmitting member 50 are bonded, its description will be omitted. The image display device 380 is a device that forms signal light modulated in intensity, emits the signal light as a scanning light TL, and includes a signal light forming unit 381 and a scanning optical system 382.

The signal light forming unit 381 includes a light source, and emits the signal light LL that is modulated and formed on the basis of a control signal from a control circuit (not shown). The scanning optical system 382 scans and outputs the signal light LL passed through the signal light forming unit 381. Here, the scanning optical system 382 includes a MEMS mirror or the like, and performs two-dimensional scanning for longitudinally and transversely changing the output angle of the light (scanning light TL) by changing a posture in synchronization with modulation of the signal light LL in the signal light forming unit 381 to adjust the optical path of the signal light LL. As described above, the image display device 380 causes the scanning light TL that is to be image light GL to enter the light guiding portion 20, and causes the scanning light TL to scan the entire partial area of the second surface S12 in which the half mirror layer 15 is formed.

An operation of the first display device 100A shown in the figure will be described. The image display device 380 emits the signal light LL toward the sixth surface S16 of the light guiding portion 20 as the scanning light TL as described above. The light guiding portion 20 guides the scanning light TL passed through the sixth surface 316 due to total reflection or the like therein, to cause the scanning light TL to reach the half mirror layer 15. At this time, as the scanning light TL is scanned on the surface of the half mirror layer 15, a virtual image is formed by the image light GL as a trace of the scanning light TL. An observer wearing the apparatus captures the virtual image by the eye EY to visually recognize the image. In this case, the sixth surface S16 of the light guiding portion 20 that is the light incident surface is a flat surface that is vertical to the optical axis of the scanning light TL. Further, the fifth surface S15 and the fourth surface S14 are flat surfaces.

Figure 24A:
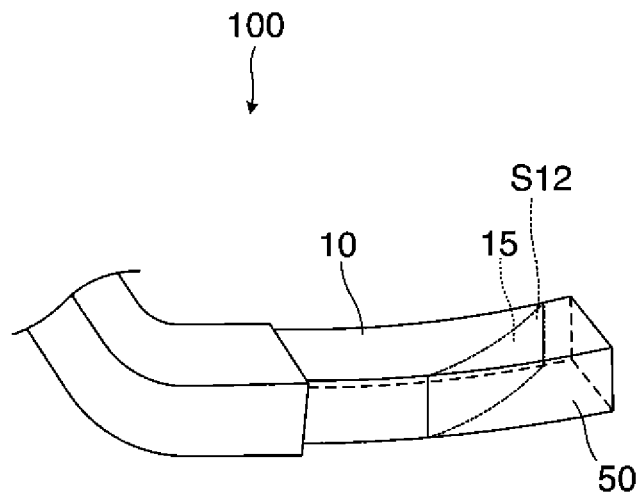
FIG. 24A is a perspective view illustrating a light guiding device and another example of a virtual image display apparatus using the light guiding device.
Figure 24B:
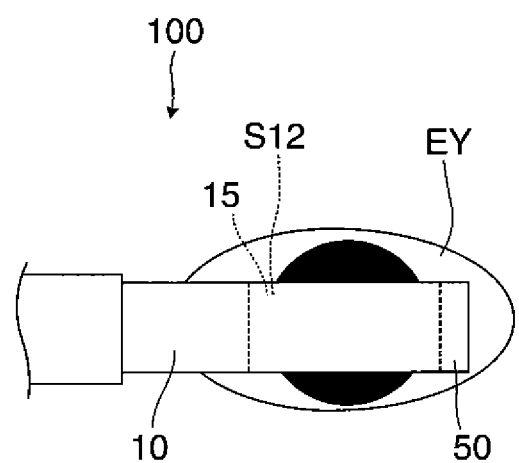
FIG. 24B is a front view thereof.

Further, in the above embodiment, the prism 10 that is the light guiding member and the light transmitting member 50 that is the auxiliary prism are configured to cover the entire front of the eye EY of the observer, but are not limited thereto. For example, as shown in FIGS. 24A and 24B, a small configuration may be used in which a portion that includes the second surface S12 which has a curved surface shape having the half mirror layer 15, covers only a part of the eye EY, that is, it covers a part of the front of the eye, and there is a portion that is not covered. Further, in this case, even with a configuration, arranged without using the see-through manner, in which the sizes of the prism 10 and the light transmitting member 50 are sufficiently small and a mirror that performs total reflection, instead of the half mirror layer 15, the observer may observe the external scene in the vicinity of the prism 10 and the light transmitting member 50. In this case, the half mirror layer 15 is formed on the entire second surface S12 or approximately the entire the second surface S12, but the half mirror layer 15 may be formed only on a part of the second surface S12. Further, in the example of FIG. 24B, the half mirror layer 15 is arranged approximately in front of the eye EY, but the half mirror layer 15 may be shifted from the front for arrangement, and the observer may move the eyes to visually recognize the image. For example, the position of the eye EY may be slightly lowered (the position of the prism 10 and the light transmitting member 50 is slightly raised). In this case, for example, the lower half of the eye EY is in a state of being capable of performing observation from the bottom of the prism 10 and the light transmitting member 50.

In the above description, the virtual image display apparatus 100 that includes one pair of display apparatuses 100A and 100B has been described, but a single display apparatus may be used. That is, a configuration may be used in which the projection see-through device 70 and the image display device 80 are not installed as a set corresponding to both of the right eye and the left eye, and the projection see-through device 70 and the image display device 80 are installed with respect to only at least one of the right eye and the left eye to view the image with a single eye.

In the above description, the interval of one pair of display apparatuses 100A and 100B in the X direction is not be described, but the interval of the display apparatuses 100A and 100B is not limited to being fixed, and the interval may be adjusted by a mechanical mechanism or the like. That is, the interval of the display apparatuses 100A and 100B in the X direction may be adjusted according to an eye width of the observer or the like.

In the above description, the half mirror layer 15 is formed by a simple semitransparent film (for example, metal reflective film or dielectric multilayer film), but the half mirror layer 15 may be replaced by a flat or curved hologram element.

In the above description, the virtual display device 100 is specifically a head-mounted display, but the virtual display device 100 may be modified into a head-up display.

In the above description, the image light is totally reflected by an interface with air without providing a mirror, a half mirror or the like on the first surface S11 and the third surface S13 of the prism 10 for guiding, but the total reflection in the virtual image display apparatus 100 according to the invention may include reflection performed by a mirror coating or a half mirror film that is formed on the entire or a part of the first surface S11 or the third surface S13. For example, the total reflection may include a case where, in a state where the incident angle of the image light satisfies the total reflection condition, the mirror coating or the like is performed on the entire or part of the first surface S11 or the third surface S13 to reflect substantially the entire image light. Further, the entire or part of the first surface S11 or the third surface S13 may be coated by a mirror having a slight permeability as long as it can obtain sufficiently bright image light.

In the above description, the prism 10 or the like extends in the horizontal direction where the eyes EY are arranged, but the prism 10 may be arranged to extend in the vertical direction. In this case, the optical member 110 has a structure of being arranged in parallel, not in series.

The entire disclosure of Japanese Patent Application Nos. 2012-038382, filed Feb. 24, 2012 and 2012-270071, filed Dec. 11, 2012 are expressly incorporated by reference herein.

What is claimed is:

1. A virtual image display apparatus that causes an observer to visually recognize image light and external light at the same time, comprising:
   an image element that generates image light; and
   a single prism that has three or more non-axisymmetric curved surfaces and forms a part of an optical system, in which an intermediate image is formed therein,
   wherein when the observer visually recognizes an external scene through a first surface and a third surface among the plurality of surfaces that form the prism, diopter is about 0,
   the first surface and the third surface form concave surfaces with respect to the observer,
   the image light from the image element is totally reflected on the third surface, is totally reflected on the first surface, and is reflected on a second surface and then passes through the first surface to reach the observer,
   when an expression of a planar shape is expanded as a polynomial, on the basis of an origin of each surface that forms the optical system, with respect to orthogonal coordinates x and y extending in a tangential direction from the origin, the following conditions (1) to (3) are satisfied where a coefficient of a term $x^m \cdot y^n$ of a polynomial indicating a k-th surface is $Ak_{m,n}$:

$$-5 \times 10^{-2} < A1_{2,0} + A1_{0,2} < -1 \times 10^{-3} \text{ and}$$

$$-5 \times 10^{-2} < A3_{2,0} + A3_{0,2} < -1 \times 10^{-3} \quad (1)$$

$$|A3_{2,0} - A3_{0,2}| < 1 \times 10^{-2} \quad (2)$$

$$|A1_{2,0} - A3_{2,0}| < 5 \times 10^{-3} \text{ and}$$

$$|A1_{0,2} - A3_{0,2}| < 5 \times 10^{-3} \quad (3), \text{ and}$$

condition (1) defines sizes of curvature of the first surface and curvature of the third surface around the origin, condition (2) defines a difference between the curvature of the third surface in an x axis direction and the curvature thereof in a y axis direction, and condition (3) defines a difference between the curvature of the first surface and the curvature of the third surface, relating to the x axis direction and the y axis direction, and influence diopter of the prism with respect to the external light.

2. The virtual image display apparatus according to claim 1,
wherein a half mirror that reflects the image light and transmits the external light is formed on the second surface to provide the image light to the observer, and a light transmitting member is integrally disposed on an outer side of the second surface so that diopter to the external light is about 0 to provide the external light and the image light to the observer in an overlapping manner.

3. The virtual image display apparatus according to claim 1,
wherein the prism includes the first surface, the second surface and the third surface and includes a first prism portion on a light exiting side and a second prism portion on a light incident side, and the first prism portion and the second prism portion are integrally formed.

4. The virtual image display apparatus according to claim 1,
wherein the light transmitting member includes a first transmitting surface and a second transmitting surface on the observer side and includes a third transmitting surface on the external side, the second surface of the prism and the second transmitting surface of the light transmitting member have approximately the same curved surface shape, and the second surface and the second transmitting surface are integrated.

5. The virtual image display apparatus according to claim 1, further comprising:
a projection lens that causes the image light from the image element to be incident onto the prism,
wherein at least a part of the prism and the projection lens form a relay optical system that forms the intermediate image.

6. The virtual image display apparatus according to claim 5,
wherein the projection lens is configured by an axisymmetric lens, and includes at least one aspheric surface.

7. The virtual image display apparatus according to claim 5,
wherein the prism includes a first prism portion and a second prism portion, the second prism portion includes at least one optical surface, and the intermediate image is formed by the image element, the projection lens and the second prism portion.

8. The virtual image display apparatus according to claim 7,
wherein the image element is an image display device that emits the image light from a display position, and
wherein the projection lens and the second prism portion, as the relay optical system, form the image light emitted from the display position of the image display device inside the prism to form the intermediate image.

9. The virtual image display apparatus according to claim 7,
wherein the second prism portion includes at least one optical surface commonly having functions of a refractive surface and a reflective surface.

10. The virtual image display apparatus according to claim 1,
wherein an interval between the first surface and the third surface is 5 mm or more and 15 mm or less.

11. The virtual image display apparatus according to claim 1,
wherein an inclination angle of the second surface with respect to the first surface is 20° or more and 40° or less.

12. The virtual image display apparatus according to claim 1,
wherein the optical system including the prism covers a part of the front of eyes of the observer in wearing, while remaining a different part of the front of the eyes that is not covered.

13. The virtual image display apparatus according to claim 1,
wherein the image element includes a signal light forming unit that emits modulated signal light corresponding to an image and a scanning optical system that scans the signal light incident from the signal light forming unit and emits the scanned signal light as a scanning light.

* * * * *